(12) United States Patent
Fuller et al.

(10) Patent No.: US 7,634,734 B2
(45) Date of Patent: Dec. 15, 2009

(54) DIRECT ACCESS TO MEDIA PLAYBACK

(75) Inventors: Andrew J. Fuller, Redmond, WA (US);
Issa Y. Khoury, Redmond, WA (US);
Allen Marshall, Woodinville, WA (US);
Vikram Madan, Bellevue, WA (US);
Sterling M. Reasor, Bellevue, WA (US);
Ravipal S. Soin, Sammamish, WA (US);
Tse-Ching James Yu, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 742 days.

(21) Appl. No.: 11/044,713

(22) Filed: Jan. 28, 2005

(65) Prior Publication Data
US 2006/0174308 A1    Aug. 3, 2006

(51) Int. Cl.
*G06F 3/00* (2006.01)
*G06F 7/00* (2006.01)
*G06F 7/04* (2006.01)
*G11B 21/08* (2006.01)

(52) U.S. Cl. .............. 715/741; 715/716; 707/104.1; 726/28; 369/30.08

(58) Field of Classification Search ............. 715/716, 715/741; 726/26, 28; 707/104.1; 369/30.08
See application file for complete search history.

(56) References Cited

U.S. PATENT DOCUMENTS 7,284,275 B2 * 10/2007 Ogawa et al. ............ 726/26
7,346,687 B2 * 3/2008 Lipscomb et al. ......... 709/226
2002/0194601 A1 * 12/2002 Perkes et al. .............. 725/44
2003/0029918 A1 * 2/2003 Leanheart et al. ...... 235/462.13
2005/0081155 A1 * 4/2005 Martin et al. ............. 715/719
2005/0172121 A1 * 8/2005 Risan et al. .............. 713/164
2006/0010383 A1 * 1/2006 Tanaka et al. ............ 715/716
2006/0064757 A1 * 3/2006 Poslinski ................. 726/26

OTHER PUBLICATIONS

Slide presentation titled "Windows Longhorn ACPI and Power Management-Part 1"; May 2004; 51 pages.
Website printout titled "LinDVD: Intervideo's DVD Multimedia Software Solution for Linux" <http://www.intervideo.com/jsp/LinDVD.jsp>; date of first publication unknown, but believed to be prior to Jan. 26, 2005; 2 pages.
Website printout titled "InterVideo InstantON" <http://www.internetvideomag.com/News/News2004/0320_04_InterVideo.htm>; date of first publication unknown, but believed to be prior to Jan. 26, 2005; 4 pages.

(Continued)

*Primary Examiner*—Ting Zhou
(74) *Attorney, Agent, or Firm*—Wolf, Greenfield & Sacks, P.C.

(57) ABSTRACT

In response to a user instruction to initiate media playback, which instruction may come from a dedicated media playback hardware button or from a user interface on a display screen, a computer operating system activates a predesignated media playback user account. The account may be limited to access of media playback applications and files located within shared directories. The operating system also launches a media playback application in response to the user instruction to initiate media playback. Instead of activating an account in response to a media playback instruction, the operating system can execute a media player application within a login screen.

15 Claims, 24 Drawing Sheets

OTHER PUBLICATIONS

Website printout titled "Welcome to the CyberLink PowerCinema Page" <http://www.gocyberlink.com/multi/products/product_main.jsp?ProdId=12>; Date of first publication unknown, but believed to be prior to Jan. 26, 2005; 2 pages.

Website printout titled "CyberLink Power Cinema 3: Top 5 Reasons to Own PowerCinema 3" <http://www.gocyberlink.com/english/products/powercinema/3/top5_reasons.jsp>; Date of first publication unknown, but believed to be prior to Jan. 26, 2005; 2 pages.

* cited by examiner

DIRECT ACCESS TO MEDIA PLAYBACK

FIELD OF THE INVENTION

The invention generally relates to electronic devices used for playback of various media such as DVDs, CDs, etc., as well as for receiving information such as may be broadcasted via radio or television. In particular, this invention relates to the use of computers for media playback and for receiving information broadcasted via radio or television and/or over the Internet.

BACKGROUND OF THE INVENTION

For some time, hardware and software manufacturers have included features in their products that permit a user to play back a previously recorded DVD, CD or other type of media on the computer. By inclusion of an appropriate tuner and other electronic components, many computers are also able to receive radio and/or television transmissions. Through the use of streaming and other techniques, many radio, television and other types of broadcasts are also available over the Internet. For convenience, "media playback" will be used herein to include (but not be limited to) playback of DVDs, CDs, and other types of removable storage media, playback of audio, video, still pictures or other type of media file stored on a computer, and playback of radio, television and other types of broadcasts (whether received over the airwaves, over the Internet, or in another manner).

As computers, and particularly laptop computers, become more advanced and more compact, and as the number of people owning and using computers continues to grow, media playback functions become increasingly important. As one example, many persons carry a laptop computer when they travel. Using a DVD media playback function, a traveler who is waiting in an airport or is on a long airplane flight can watch a movie to help pass the time.

For various reasons, it is desirable to make the media playback functionality of a computer more similar to that of consumer electronic devices that are dedicated to media playback (e.g., dedicated DVD players, televisions, radios, etc.). In particular, there is an industry effort to simplify the procedure for using a computer for media playback. With a dedicated media playback device such as a DVD player or television, only a few steps are typically required to begin using the device. Often, the user need only turn on the power and (in the case of a DVD player) put in the DVD to be watched. Computers, however, generally require more effort. If the computer is not already in use, a user may first need to boot the computer and/or login with a user name and/or password. The user must often locate and launch an appropriate application program. Although these steps are not especially challenging for most computer users, they can be inconvenient. For less sophisticated users, these additional steps can pose a more significant impediment.

Using a computer for media playback can also exacerbate security and privacy concerns. In many cases, a single computer is used by many people. Some of those users (e.g., parents in a household) may store confidential and/or critical data on the computer, while others (e.g., children) may only want to use the computer to watch a movie. User ids and passwords can make it is possible to restrict the programs and data accessible by different persons. However, this solution is often not used. Assigning user ids and passwords, as well as configuring a computer to restrict access based on user id, can require time and/or expertise that a typical consumer may not possess. As more users routinely access the same computer for such tasks as media playback, the likelihood of security or privacy compromises can increase.

To date, there have been some efforts to make computers more like dedicated media playback devices. One technique is to configure a computer for dual booting. More specifically, two separate operating systems (OSs) are installed on the computer in separate partitions of the hard drive (or one operating system may be installed in the hard drive and another OS may reside in firmware). One OS, which may be smaller and/or more specialized (e.g., Linux, or the WINDOWS CE OS available from Microsoft Corporation of Redmond, Wash.) is booted when the user only wishes to perform media playback. When the user wishes to use the computer for other purposes, the other OS (e.g. the WINDOWS XP operating system available from Microsoft Corporation) is booted.

A dual-boot solution presents several problems, however. Even though a first (or "primary") OS and a second OS intended for media playback may operate in separate partitions, the media-playback OS may still have access to the file structure of the primary OS. This can have serious security and privacy implications, especially if the second OS is allowed to read and/or write data to the partition managed by the first OS. In such a case, any access control or other security mechanisms of the first OS can be bypassed by the second OS. On the other hand, disallowing cross-partition access also presents problems. If there is no cross-partition access, a user would not have full access to media files stored on another partition.

A dual-boot system can also pose significant burdens upon a computer manufacturer.

For example, the primary OS (i.e., the OS used for conventional purposes and not limited to media playback) could be manufactured by one company, and the OS used for media playback may be manufactured by a second company or be an open-source product. If the two OSs are provided by separate companies, the computer manufacturer may be forced to pay two separate license fees. Even if one OS is open source, the computer manufacturer would usually bear the financial burden of any required modifications to the open source OS. The manufacturer would also be required to create duplicate media hardware drivers for each OS. Providing technical support, product updates and patches for two OSs could also be significantly more complex than is the case with a single OS. Aside from the financial implications of installing and supporting two different OSs, a dual boot system is often unsatisfactory from a user perspective. In a dual-boot environment, a user must reboot or power down if he or she wishes to switch from a media-playback mode to a normal operating mode. This results in a transition from one OS to another which is abrupt and undesirable from a usability point of view. For example, pausing a movie to read a document, check e-mail or perform some other task would be cumbersome.

For these and other reasons, there remains a need for systems and methods permitting a computer to be more easily used for media playback.

SUMMARY OF THE INVENTION

Embodiments of the invention address the above-described challenges by providing users a more accessible manner of activating a media player program. In some embodiments, a dedicated media playback hardware button is provided. Upon actuation of this button, a dedicated media playback user account is activated, and a media playback program is launched. The dedicated media playback user account is, in at least some embodiments, limited to access of media playback programs and files located within shared directories. If the media playback button is pressed while another user account is active, the media player program is automatically launched within the already-active user account. In other embodiments, a dedicated hardware button is not used. Instead, a media playback option is offered on a login screen. Upon selection of this option, a dedicated media playback account is activated and a media playback program launched. Alternatively, a user instruction to begin media playback can cause activation of an account which is not limited to media playback. In still other embodiments, a media playback instruction causes a media player program to be launched within a login window, and without activation of any user accounts.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE PREFERRED EMBODIMENTS

Figure 1:
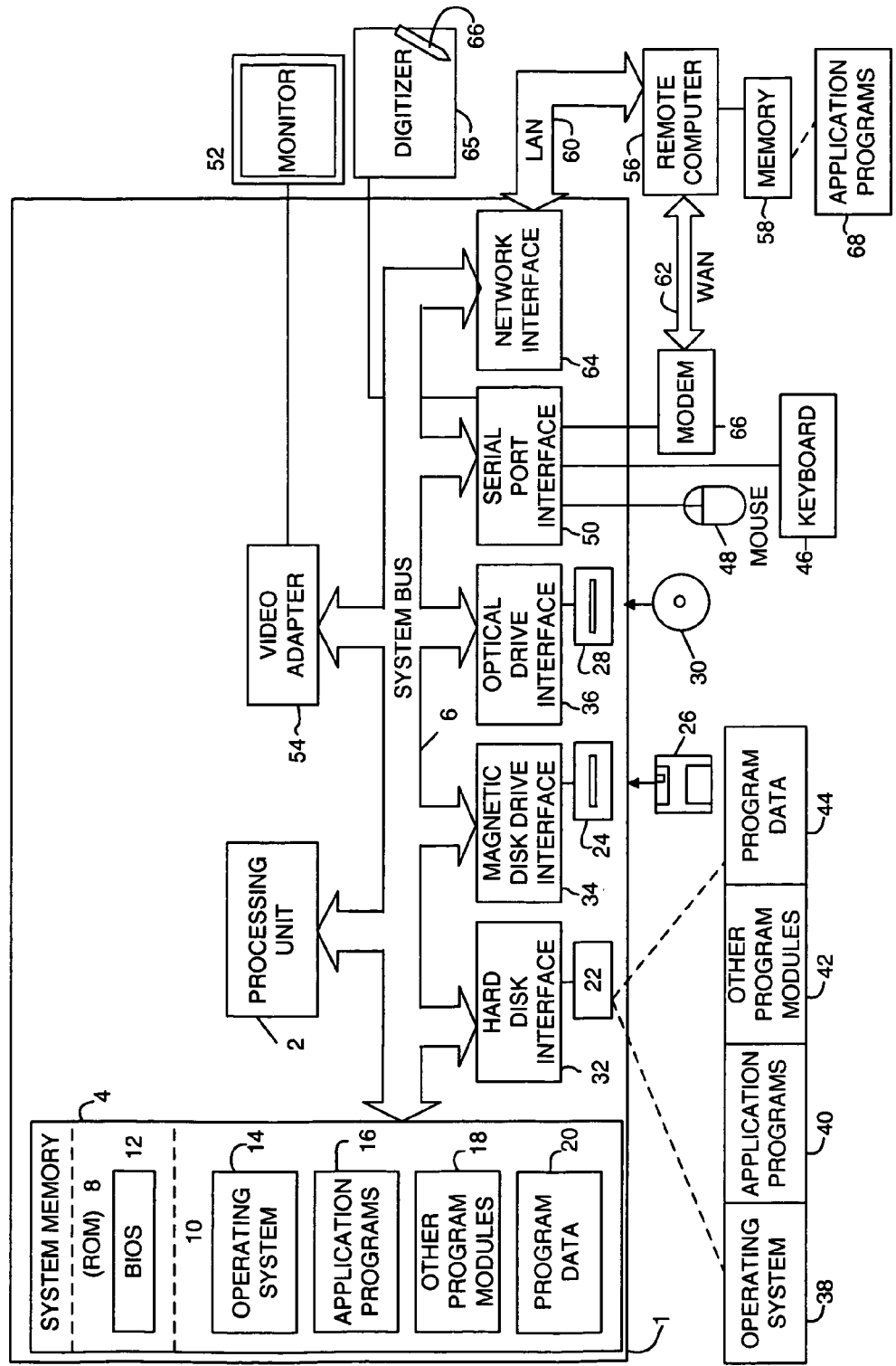
FIG. 1 is a block diagram of an example of a computing system environment in which embodiments of the invention may be implemented.

FIG. 1 illustrates an example of a suitable computing system environment 1 in which the invention may be implemented. The computing system environment 1 is only one example of a suitable computing environment and is not intended to suggest any limitation as to the scope of use or functionality of the invention. Neither should the computing environment 1 be interpreted as having any dependency or requirement relating to any one or combination of components illustrated in the exemplary computing environment 1. Embodiments of the invention will also be described using as examples data structures found in the WINDOWS XP operating system (available from Microsoft Corporation of Redmond, Wash.). However, the invention is not limited to implementation in connection with a specific operating system.

The invention is operational with numerous other general purpose or special purpose computing system environments or configurations. Examples of well known computing systems, environments, and/or configurations that may be suitable for use with the invention include, but are not limited to, personal computers, hand-held or laptop devices, multiprocessor systems, microprocessor-based systems, minicomputers, and the like. The invention is described in the general context of computer-executable instructions, such as program modules, being executed by a computer. Generally, program modules include routines, objects, components, data structures, etc. that perform particular tasks or implement particular abstract data types.

With reference to FIG. 1, an exemplary system for implementing the invention includes a general purpose computing device in the form of a computer 1. Hardware components of computer 1 may include, but are not limited to, processing unit 2, system memory 4 and system bus 6 that couples various system components (including system memory 4) to processing unit 2. System bus 6 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus also known as Mezzanine bus.

Computer 1 typically includes a variety of computer readable media. Computer readable media can be any available media that can be accessed by computer 1 and includes both volatile and nonvolatile media, removable and non-removable media. By way of example, and not limitation, computer readable media may comprise computer storage media and communication media. Computer storage media includes volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 4 includes computer storage media in the form of volatile and/or nonvolatile memory such as read only memory (ROM) 8 and random access memory (RAM) 10. Basic input/output system 12 (BIOS), containing the basic routines that help to transfer information between elements within computer 1, such as during start-up, is typically stored in ROM 8. RAM 10 typically contains data and/or program modules that are immediately accessible to and/or presently being operated on by processing unit 2. By way of example, and not limitation, FIG. 1 illustrates operating system (OS) 14, application programs 16, other program modules 18 and program data 20.

Computer 1 may also include other removable/non-removable, volatile/nonvolatile computer storage media. By way of example only, FIG. 1 illustrates hard disk drive 22 that reads from or writes to non-removable, nonvolatile magnetic media, magnetic disk drive 24 that reads from or writes to removable, nonvolatile magnetic disk 26 and optical disk drive 28 that reads from or writes to removable, nonvolatile optical disk 30 such as a CD ROM, CDRW, DVD or other optical media. Other removable/non-removable, volatile/nonvolatile computer storage media that can be used in the exemplary operating environment include, but are not limited to, magnetic tape cassettes, flash memory cards, digital video tape, solid state RAM, solid state ROM, and the like. Hard disk drive 22 is typically connected to system bus 6 through a non-removable memory interface such as interface 32, and magnetic disk drive 24 and optical disk drive 28 are typically connected to system bus 6 by a removable memory interface, such as interfaces 34 and 36.

The drives and their associated computer storage media, discussed above and illustrated in FIG. 1, provide storage of computer readable instructions, data structures, program modules and other data for computer 1. In FIG. 1, for example, hard disk drive 22 is illustrated as storing OS 38, application programs 40, other program modules 42 and program data 44. Note that these components can either be the same as or different from OS 14, application programs 16, other program modules 18 and program data 20. OS 38, application programs 40, other program modules 42 and program data 44 are given different numbers here to illustrate that, at a minimum, they are different copies. A user may enter commands and information into computer 1 through input devices such as keyboard 46 and pointing device 48 (shown as a mouse, but which could be a trackball or touch pad). Other input devices (not shown) may include a microphone, joystick, game pad, satellite dish, scanner, or the like. These and other input devices are often connected to processing unit 2 through user input interface 50 that is coupled to the system bus. Although mouse 48, keyboard 46 and modem 66 are shown in FIG. 1 as connected to computer 1 through a serial port, these and other devices may be connected to computer 1 through other ports (e.g., a parallel port, PS/2 port, game port or a universal serial bus (USB) port) and related interfaces and structures. Monitor 52 or other type of display device is also connected to system bus 6 via an interface, such as video interface 54. In addition to the monitor, computers may also include other peripheral output devices such as speakers (not shown) and a printer (not shown), which may be connected through an output peripheral interface (not shown).

Computer 1 may operate in a networked environment using logical connections to one or more remote computers, such as remote computer 56. Remote computer 56 may be a personal computer, a server, a router, a network PC, a peer device or other common network node, and typically includes many or all of the elements described above relative to computer 1, although only memory storage device 58 has been illustrated in FIG. 1. The logical connections depicted in FIG. 1 include local area network (LAN) 60 and wide area network (WAN) 62, but may also include other networks. Such networking environments are commonplace in offices, enterprise-wide computer networks, intranets and the Internet.

When used in a LAN networking environment, computer 1 is connected to LAN 60 through network interface or adapter 64. When used in a WAN networking environment, computer 1 may include modem 66 or other means for establishing communications over WAN 62, such as the Internet. Computer 1 may also access WAN 62 and/or the Internet via network interface 64. Modem 66, which may be internal or external, may be connected to system bus 6 via user input interface 50 or other appropriate mechanism. In a networked environment, program modules depicted relative to computer 1, or portions thereof, may be stored in the remote memory storage device. By way of example, and not limitation, FIG. 1 illustrates remote application programs 68 as residing on memory device 58. It will be appreciated that the network connections shown are exemplary and other means of establishing a communications link between computers may be used.

Figure 2:
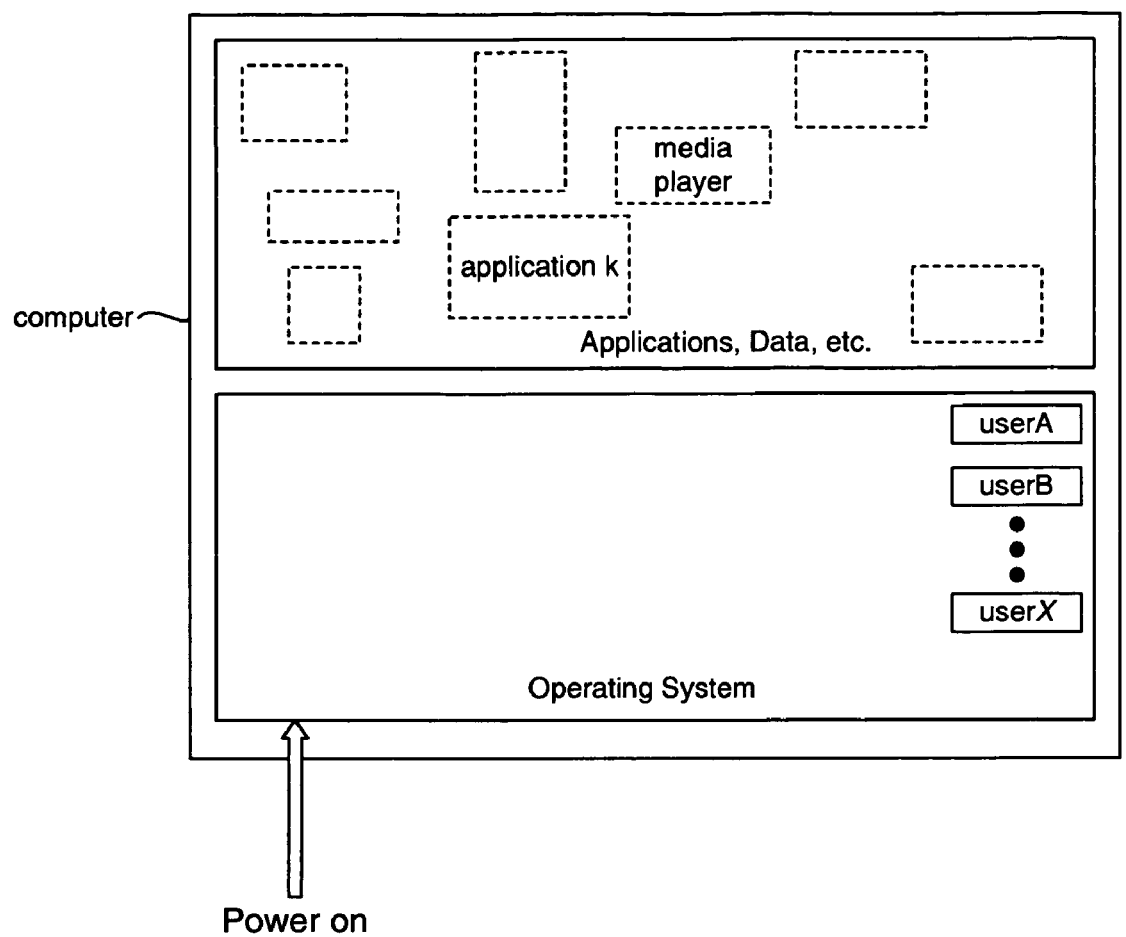
FIGS. 2-4 are block diagrams describing existing systems for controlling user access to objects stored on a computer.
Figure 3:
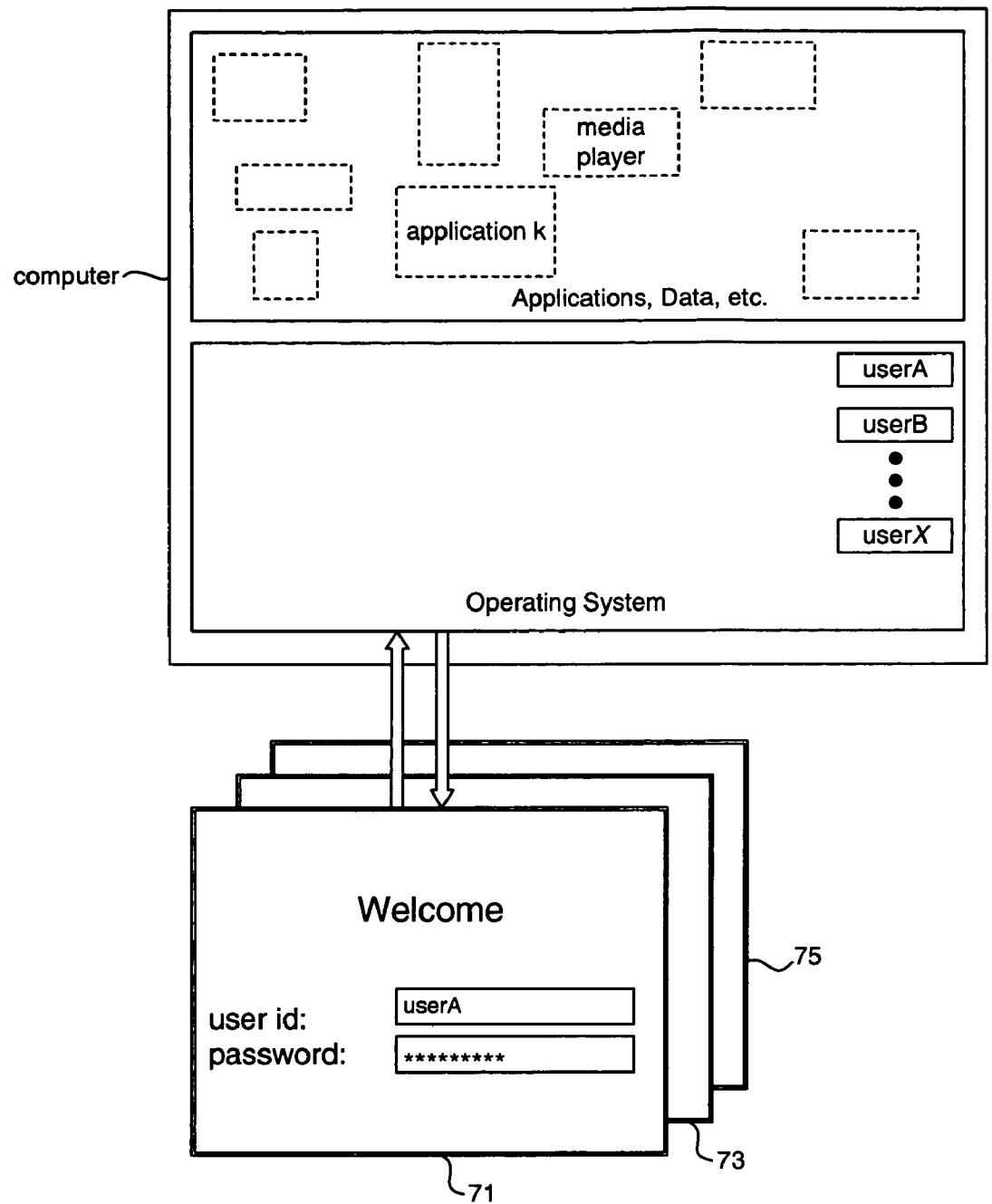
Figure 4:
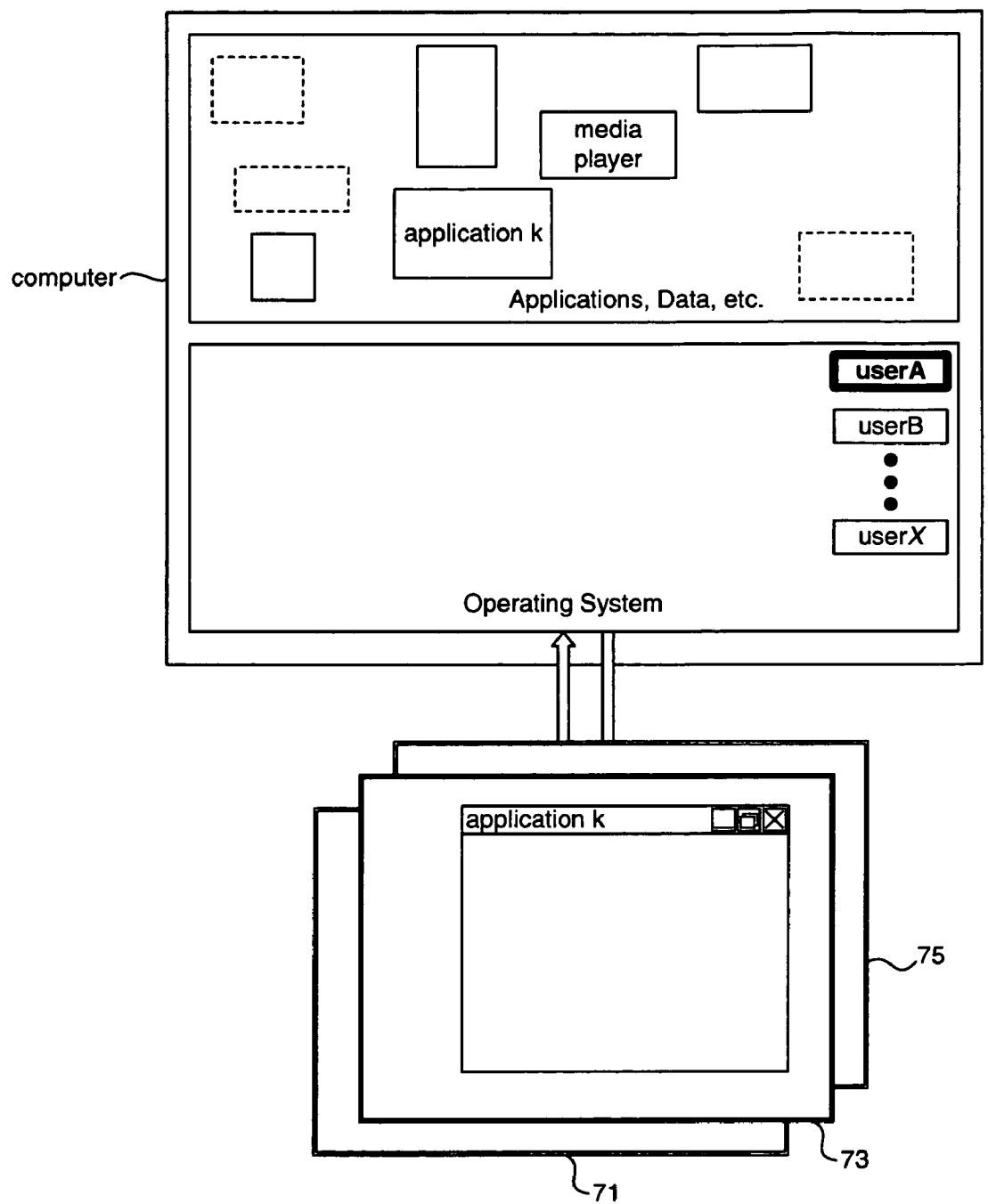

In at least some embodiments, the invention is implemented through modification of existing software components controlling user access to programs, data and other objects stored on a computer. So as to provide a convenient frame of reference for describing such embodiments, existing methods for regulating user access are first discussed in connection with FIGS. 2-4. In particular, various user logon and access control aspects of the WINDOWS XP OS are described. The following description of FIGS. 2-4 is merely intended to give a brief overview; additional details of existing logon and access control aspects of the WINDOWS XP OS are known in the art, and are also available from Microsoft Corporation at <http://msdn.microsoft.com>. Beginning in FIG. 2, a block diagram of a computer (which may be similar to computer 1 from FIG. 1) is presented. An OS is shown schematically as a large block. Other software objects such as application programs and program data are represented collectively as another large block.

The OS includes data identifying various accounts for authorized users of computer 1. An account includes a user identification ("user id"), and can be used by the OS to determine who may be using the computer. In particular, the OS requires that users of the computer "log in" and activate one of the accounts before accessing most features of the computer. In some cases, password protection for an account may be enabled. In other words, the OS will not allow a user to log into an account (and will thus not make that account active) until the proper password is supplied. Some accounts may not have passwords, and can be logged into (activated) by simply identifying the user id for the account. If the OS only has a single account, and that account does not have a password, the OS may automatically log in any user into that single account without prompting for a password or displaying a user interface indicative of the login process. Once a user successfully activates an account, and as described more fully below, the OS allows various computer resources to be used in accordance with rules previously established for that active account. For example, the OS permits access to application programs and other data objects based on the account which is active. The OS may also limit a user's ability to perform system-related tasks (e.g., shutting down the computer, installing software, etc.) based on which account is active. Various programs (e.g., an OS-resident media player) may also be part of the OS, and access to such OS-resident programs may also be controlled based on the active account. In FIG. 2, several accounts are shown as boxes within the OS and as having user ids "userA" through "userX." The vertical ellipsis between userB and userX indicates that there may be an arbitrary number of accounts. Each account may correspond to a single person or to multiple persons. Moreover, an individual may be authorized to access the computer using more than one account.

When a user successfully logs into the computer and activates an account, the OS creates an access token for the active account. The access token links the active account to the current user, and contains a list of privileges associated with that account. Each of the application and data objects installed on the computer includes a security descriptor. An object's security descriptor may contain a list of accounts which may access the object (or which may not access the object), and may also specify the type of access permitted (e.g., the right to read, delete, execute, write, etc.). When a user attempts to access an object, the OS compares the active account access token with the security descriptor for that object. If the active account has been granted access to the object, the requested operation (e.g., reading a file, launching an application, etc.) proceeds. Otherwise, the requested operation will not be performed. In some cases, a user will not be able to request access to an object for which the active account does not have access rights. In other words, an inaccessible object may be hidden from the user.

In FIG. 2, the computer is in an S5 power state. An S5 power state is defined by the Advanced Configuration Power Interface Specification revision 3.0 ("ACPI specification"), available from <http://www.acpi.info/> and incorporated by reference herein. State S5 is a "soft" off state, and a complete OS reboot is necessary for returning to a G0 (or working) state, also defined by the ACPI specification. In order to initiate the booting process, a user first turns on the computer by pressing an "ON" switch. After turning on the computer, and after the OS loads from the hard drive and performs various checks and other tasks, a logon component of the OS initializes. This is shown in FIG. 3. In the WINDOWS XP OS, the logon component includes a Winlogon executable and a Graphical Identification and Authentication dynamic-link library (DLL) referred to as the GINA. The logon component creates three desktops. A desktop is an object for which a virtual desktop may be created on a display screen, and which can contain dialog user interfaces, menus, and other types of windows and user interfaces. The desktops created by the logon components include a logon desktop 71, an application desktop 73 and a screen-saver desktop 75. Logon desktop 71 is used by the logon executable and GINA to receive user ids and passwords. Typically, logon desktop 71 displays a graphical dialog interface through which the user provides a user id and a password (if passwords are enabled for the entered user id). Other dialogs, messages, etc. may also be generated in the logon desktop.

An active account is shown in the drawings with a thickened line around the corresponding account box. In FIG. 4, the user id and password for the userA account have been provided, and that account is now active. Once an account is active, and as shown in FIG. 4, the OS switches to application desktop 73. Application desktop 73 is where most user activity generally takes place. From the application desktop, the user may launch programs, etc. In the WINDOWS XP OS, the application desktop usually contains the familiar task bar and "start" menu. From this desktop, the user may access application and data objects in accordance with access rights of the active account. Screen saver desktop 75 becomes active when a screen saver is running, and is not further discussed herein.

In FIG. 4, the objects which the active account (userA) may access are shown schematically as solid boxes. The objects which the userA account may not access are shown as broken line boxes. Two of the userA-accessible objects include an arbitrary application k (which may have associated DLL and other objects, not shown) and a media player program (which may also have other associated objects). As used herein, "media player program" refers to a program (whether an application program or a program contained within an OS) with which a user can playback one or more types of media (e.g., watch a DVD, listen to a radio broadcast, etc.) One example of a media player program is the WINDOWS MEDIA PLAYER FOR WINDOWS XP application. Because the active account (userA) is allowed access to application k, and as shown in FIG. 4, the user is permitted to launch that application.

Figure 5:
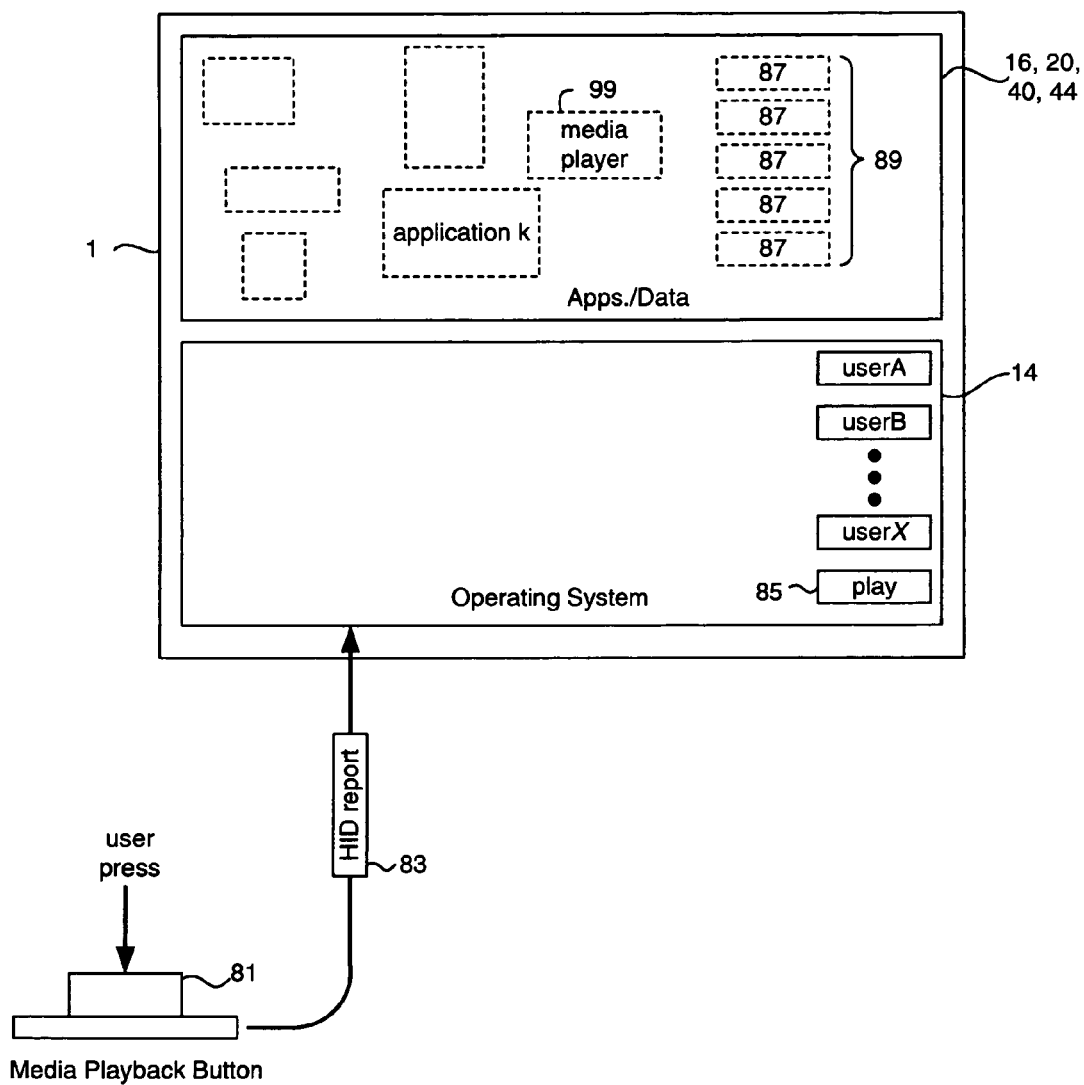
FIGS. 5 and 6 show direct media playback according to illustrative embodiments of the invention.

FIG. 5 shows a computer 1 having an OS 14 according to at least some embodiments of the invention, and which utilizes the accounts and related access control features described in connection with FIGS. 2-4 to implement direct media playback. Also installed on computer 1 are numerous application and data objects. These objects correspond to the application programs 16 and/or 40 shown in FIG. 1, as well as to the program data 20 and/or 44 shown in FIG. 1. Accordingly, the larger box surrounding these objects is labeled 16, 20, 40, 44. As in FIGS. 2-4, accessible objects are shown in FIGS. 5-23 as solid line boxes. Objects which may not be accessed are shown as broken line boxes. Because no account is currently active in FIG. 5, all of the application and program data boxes are shown with broken lines. Similar to the OS in FIGS. 2-4, OS 14 includes data corresponding to various user accounts "userA" through "userX". Unlike the OS in FIGS. 2-4, however, OS 14 also includes a special playback account 85. Playback account 85 is created to allow limited access to media playback and data objects. In other words, playback account 85 is only allowed to access media player application 99 and certain media files located in predesignated directories. In at least some embodiments implemented using the WINDOWS XP operating system, playback account 85 is similar to a "guest" account, but may have fewer access rights and privileges than a conventional guest account. In the embodiments shown in FIG. 5 and in subsequent FIGS., media playback is performed by an application program. In other embodiments, a media playback program may be part of the OS, with a media playback account limited to accessing that OS-contained program.

Computer 1 is in an S5 state in FIG. 5, and as indicated above, no users have logged in (i.e., no accounts are active). When a user wishes to use computer 1 for media playback, the user presses a special media playback launch button 81. Button 81 may be located on computer 1, on a keyboard (not shown in FIG. 5) or otherwise in communication with computer 1. Button 81 is, in effect, a second power on/off button for computer 1. However, and as described in more detail below, turning on computer 1 using button 81 causes a special HID (human interface device) report 83 to be transmitted to OS 14. In response to HID report 83, and as shown FIG. 6, OS 14 boots and activates playback account 85. Similar to the OS described in connection with FIGS. 2-4, OS 14 also creates a logon desktop 91, an application desktop 93 and a screen saver desktop 95. Instead of displaying a logon dialog in desktop 91, however, and in response to receipt of HID report 83, OS 14 automatically activates playback account 85. In other words, it is though HID report 83 causes OS 14 to automatically supply a user id corresponding to playback account 85 in a logon dialog similar to that shown in FIG. 3, without requiring a password. OS 14 then automatically launches media player application 99 in the application desktop without displaying a login screen. The user may then insert and play a DVD or otherwise playback media. In addition to the media player application, playback account 85 is also given access to other application programs and related objects that may be needed for media playback (e.g., applications controlling a DVD drive, sound card applications allowing adjustment of volume and other sound properties, etc.), as well as any required driver programs and other objects within OS 14. In at least some embodiments, playback account 85 is also given access to files 87 within a predesignated directory 89. Access to this directory may be shared with other accounts. Files 87 might include audio and/or video files that have been stored on a hard drive of computer 1, still images that have been stored on computer 1, or other types of media files.

After the user has finished watching a DVD or is otherwise not desirous of further media playback, the user can shut down computer 1 in a conventional manner (e.g., initiating a shut down command). In some embodiments, the user can shut down computer 1 by pressing button 81 a second time. The second press of button 81 generates a second HID report, which OS 14 is configured to treat as a user request to shut down computer 1. If the user does not wish to shut down computer 1 after completion of media playback, and instead wishes to perform other tasks with computer 1, the user can log out from media playback account 85 (i.e., deactivate account 85) and log in using (i.e., activate) another account. In embodiments implemented using the WINDOWS XP OS, the user can actually remain logged in under media playback account 85, but switch to another account using the "fast user switching" feature. In particular, this feature allows multiple user accounts to be activated at once, but only one account is in the foreground at any given time. Programs launched under a first activated account remain open if a second account is activated and is made the foreground account (i.e., the first account is moved to the background), but a user may only access programs running under the foreground account. In order to resume access to an application running under a background account, the user must switch to that account (i.e., make the background account a foreground account). In this scenario, media player application 99 would remain open under account 85 if another account (e.g., userA) is activated and brought to the foreground, but would be inaccessible until the user switched back to account 85. A user may want to switch from media access account 85 to another account if, e.g., a user wished to access a media file stored in a directory not accessible by playback account 85.

In at least some embodiments, OS 14 returns to logon desktop 91 when a user indicates he or she no longer wishes to playback media within playback account 85.

Figure 6:
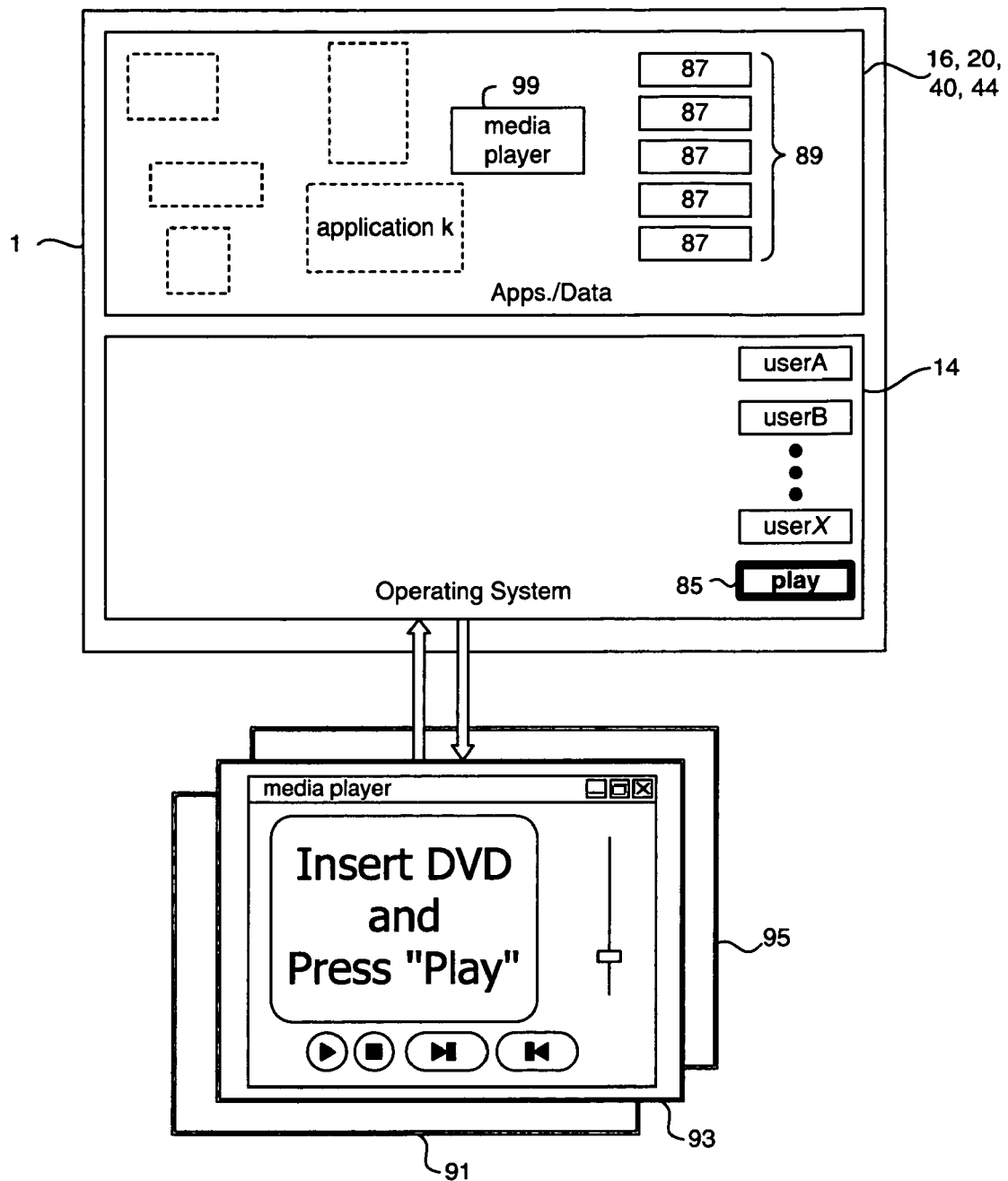
Figure 7:
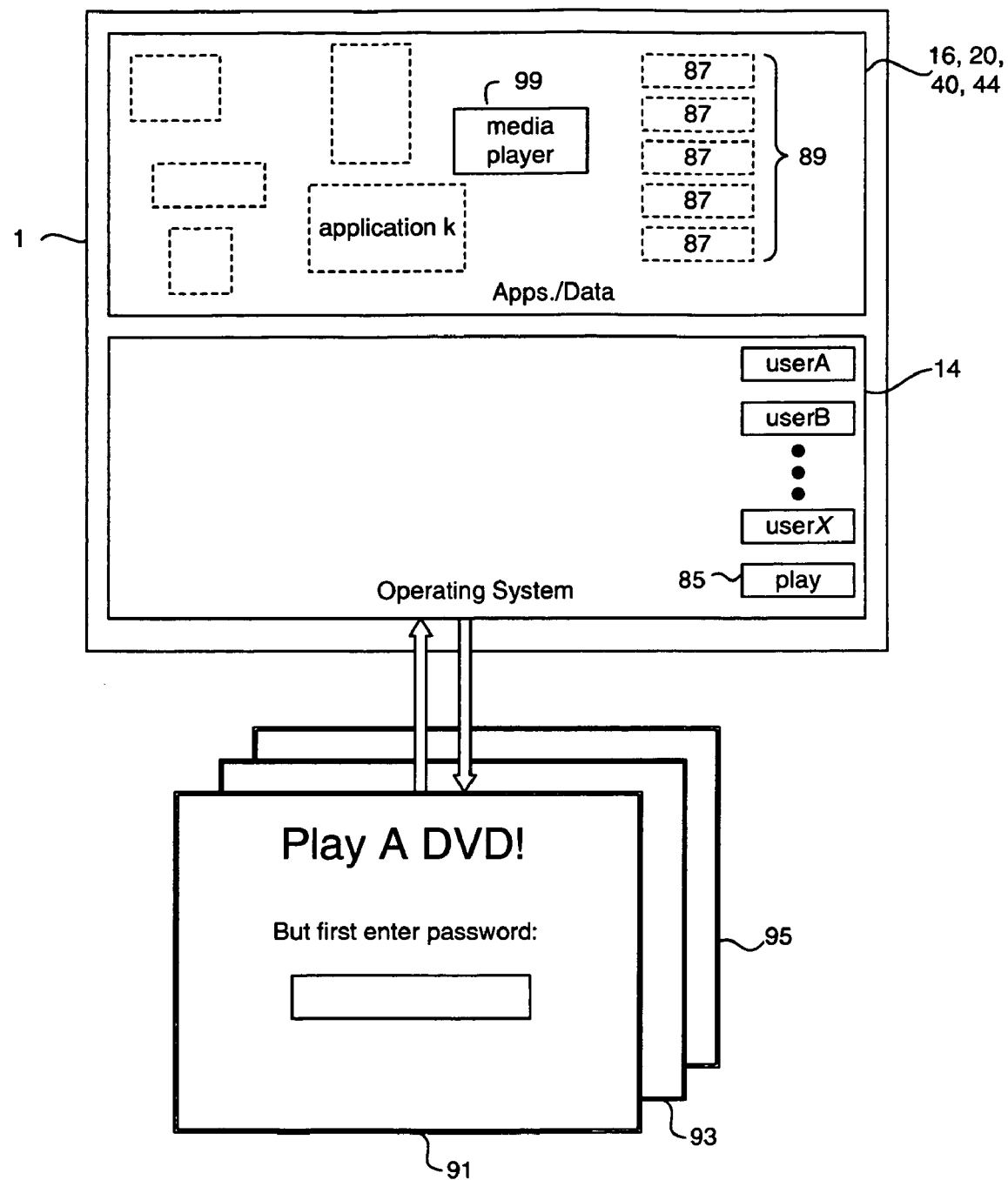
FIGS. 7-9 show variations on the direct media playback of FIGS. 5 and 6.

Although a password was not required for media playback account 85 in the example of FIGS. 5 and 6, a password could be added. This is shown in FIG. 7. In response to HID report 83 (not shown in FIG. 7), OS 14 automatically selects playback account 85, but first requires the user to enter a password before activating playback account 85. This feature might be used, for example, if a parent wished to limit use by children of a computer's media playback features. In the embodiment shown in FIG. 7, a special dialog is shown to the user in logon desktop 91 so as to indicate that the logon will be for media playback only. Upon entering the proper password, the user will be given access to the media player application and other related files, as in FIG. 6.

Although FIGS. 5-7 show activation of playback account 85 from an S5 state when button 81 is pressed, the invention is not limited in this regard. For example, computer 1 might be placed into an S3 or S4 state instead of an S5 state after all users (including users under playback account 85) have logged off. S3 and S4 states are also described in the previously incorporated ACPI specification. State S3 is a low-latency sleeping state in which power is removed from the CPU, cache and chipset, but is maintained to system memory (RAM). Returning the computer to a G0 state from S3 is relatively fast, as previous programming context is still in RAM. State S4 is defined as a lower-power, longer wake-latency sleep state. When entering an S4 state, current platform context (e.g., system and programming settings) is saved from RAM to the hard drive, and power is then removed from the RAM, CPU, cache and chipset. When the system is returned to G0 from S4, platform context is restored from the hard drive without rebooting the OS. Waking from S4 requires more time than waking from an S3 state, but less time than an OS reboot. If computer 1 is in an S3 or S4 state when a HID report 83 is received by OS 14, OS 14 returns computer 1 to a G0 state, activates playback account 85 (after input of a password, if enabled for playback account 85) and launches media player application 99.

Figure 8:
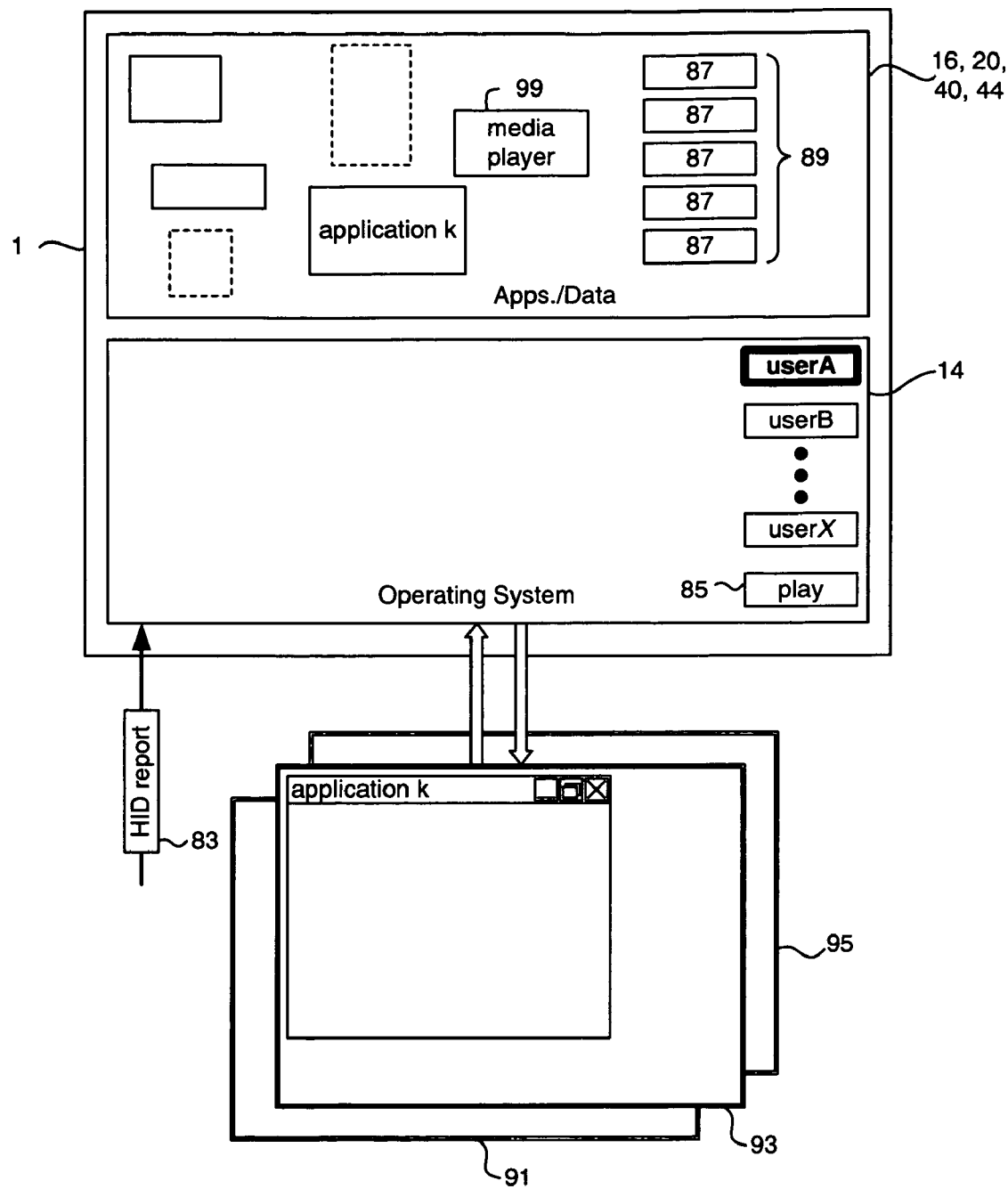
Figure 9:
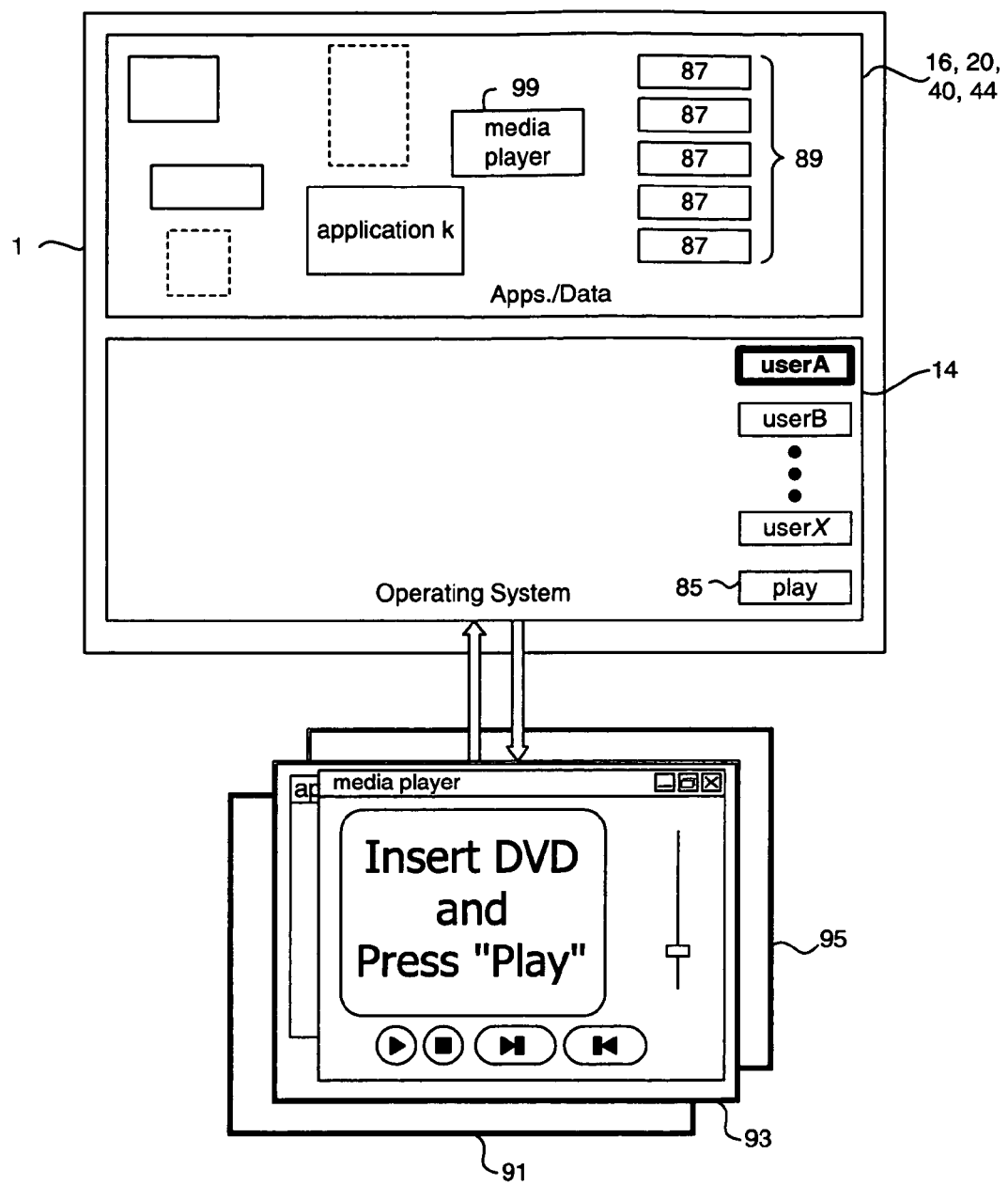

FIGS. 8 and 9 show what occurs, in at least some embodiments, when a user presses media playback button 81 when an account other than playback account 85 is active, and when playback account 85 is not active. In FIG. 8, a user is logged in under the userA account and has opened application k. When the user presses button 81 and OS 14 receives HID report 83, media player application 99 is automatically launched within the userA account (FIG. 9); playback account 85 is not activated. If computer 1 enters an S3 or S4 state while a user is logged in under the userA account, pressing of button 81 causes OS 14 to 1) wake computer 1, 2) require input of the password for the userA account (if there is a password for the account and OS 14 is configured to check that password upon waking), and then 3) launch media player application 99 upon entry of the proper password. If password protection (or check password upon wake) is not enabled for the userA account, pressing button 81 causes OS 14 to wake computer 1 and launch media player application 99.

Figure 21:
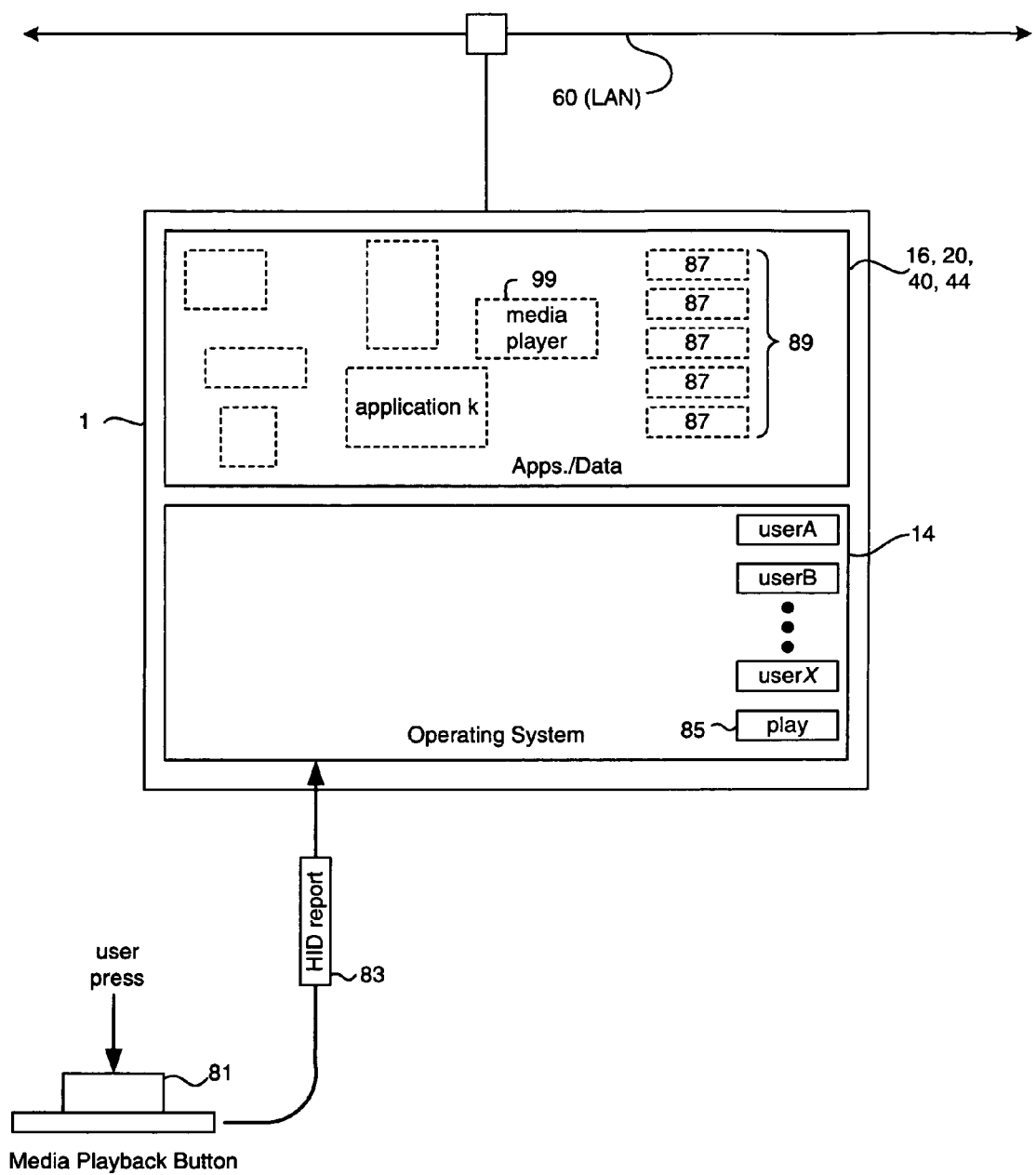
FIGS. 21-23 show receipt of a media playback request by a computer on a domain.
Figure 22:
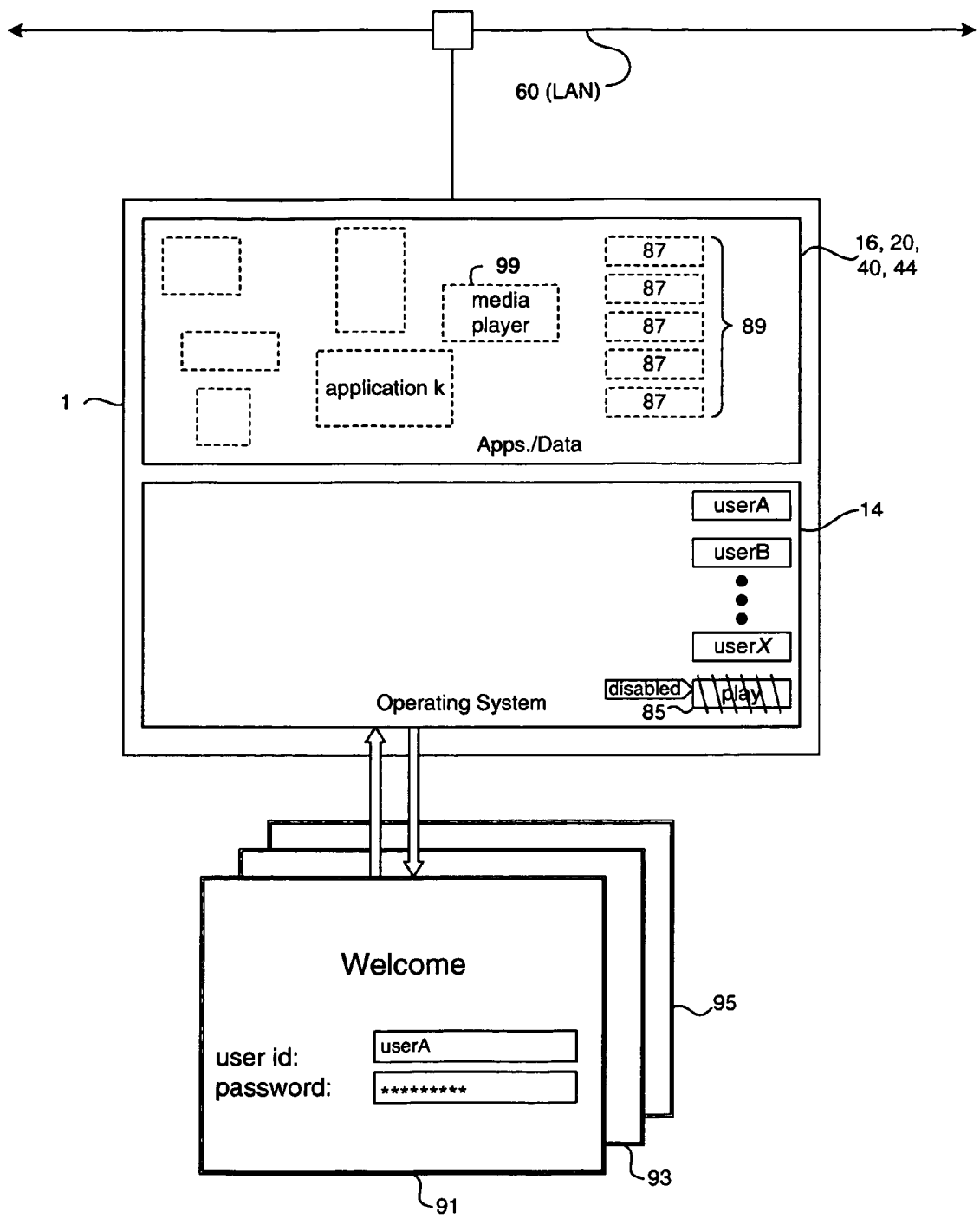
Figure 23:
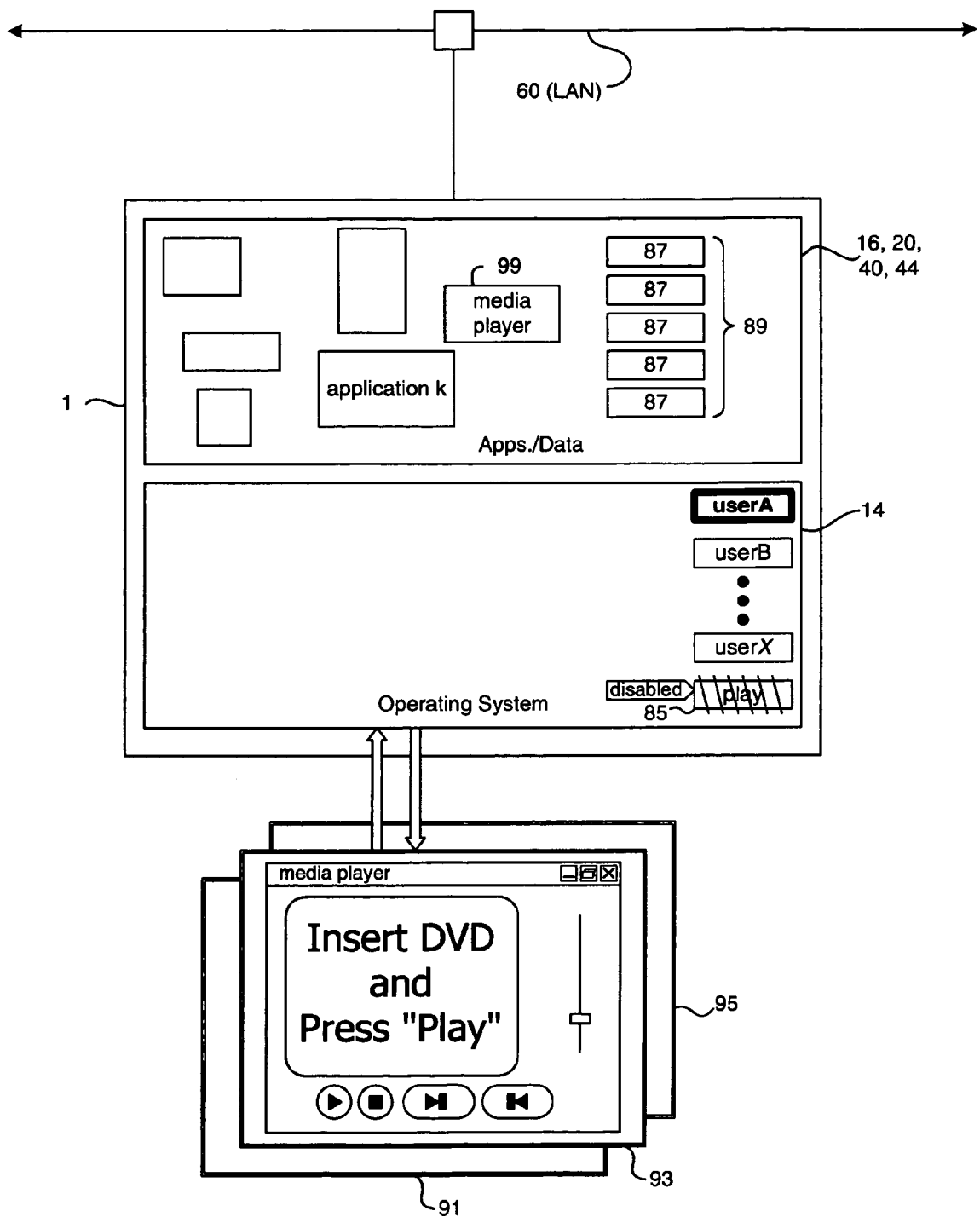

In at least some embodiments, and after receipt of HID report 83, OS 14 first determines if computer 1 is on a domain (e.g., a networked PC) before opening playback account 85. Security requirements are generally more strict for networked computers, and additional software modifications may be needed to allow limited file access by playback account 85. Because many users of a direct media playback feature will be in a non-domain setting (e.g., a laptop computer in an airport, a home computer), the costs of such additional software modifications may thus outweigh benefits under some conditions. In FIG. 21, computer 1 is connected to LAN 60, and OS 14 receives HID report 83. Upon determining that computer 1 is on a domain, based on the configuration or settings specified by the domain administrator, and as shown in FIG. 22, OS 14 displays a conventional logon desktop, and does not allow activation of playback account 85 (shown as "disabled"). After receiving a user id for a conventional account and password (if password protection is enabled), OS 14 activates that account and then automatically activates the media player application (FIG. 23).

Table 1 summarizes responses of OS 14, according to the embodiments described above, to a press of media playback button 81 (i.e., to receipt of HID report 83) under various scenarios.

TABLE 1

| Scenario | Behavior |
| --- | --- |
| State G0; user is logged in under account other than direct media playback account | Media player application launched; user has access to files for his or her account and for direct media playback account |
| State S3 or S4; user is logged in under account other than direct media playback account and option to check password on resume disabled | Wake and launch media player application in current account |

TABLE 1-continued

| Scenario | Behavior |
| --- | --- |
| State S3, S4 or S5; no user logged in; option to check password on resume enabled or disabled; no password for direct media playback account | Wake (or boot if in S5) and log into direct media playback account; launch media player application; user has access to files for which direct media playback account has access rights |
| State S3, S4 or S5; no user logged in; option to check password on resume enabled or disabled; password for playback account | Wake (or boot if in S5) and require entry of password for direct media playback account; upon entry of proper password, launch media player application; user has access to files for which direct media playback account has access rights |
| State S5; computer is on a domain | Require input of user id and password (if password enabled) for conventional account; upon successful logon, launch media player application |
| State S3 or S4; user is logged on under conventional account; computer is on a domain; option to check password on resume is disabled | Wake computer and launch media player application |

In at least some embodiments, the response of OS 14 to a press of media playback button 81 can be configured by a user. A manufacturer of the computer may initially set OS 14 to launch a particular application in response to a press of button 81. A user may then reset OS 14 to launch a different application in response to a press of button 81. This could be useful, for example, if a user later installs a different media player application on the computer. In some embodiments, only a user logged in under an "administrator" account (i.e., an account with full system modification privileges) can designate the application to be launched in response to pressing of button 81. Of course, a user could also designate an application other than a media player application for automatic launch in response to pressing button 81.

In at least some embodiments, a user (e.g., a user having administrative account privileges) can also configure OS 14 to associate a press of button 81 with a different account. If a different account is associated with button 81, pressing of button 81 will cause that account to be automatically activated. If there is a password for that account, entry of that password will be first requested at the logon screen desktop. Once the account is activated, the media player application is automatically launched. If another application has been designated for automatic launch, that other application is launched.

Figure 10:
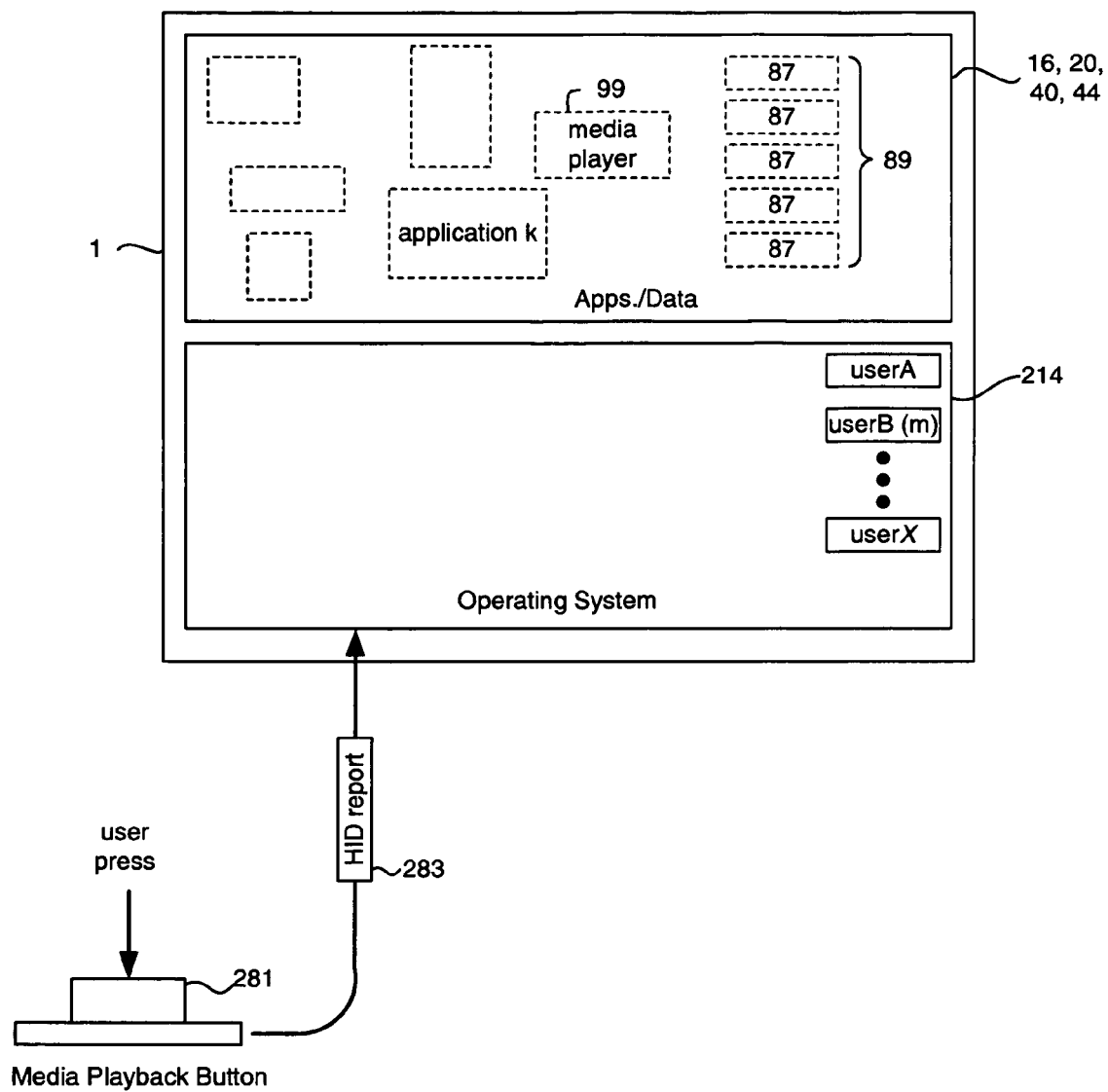
FIGS. 10 and 11 show direct media playback according to some additional illustrative embodiments of the invention.
Figure 11:
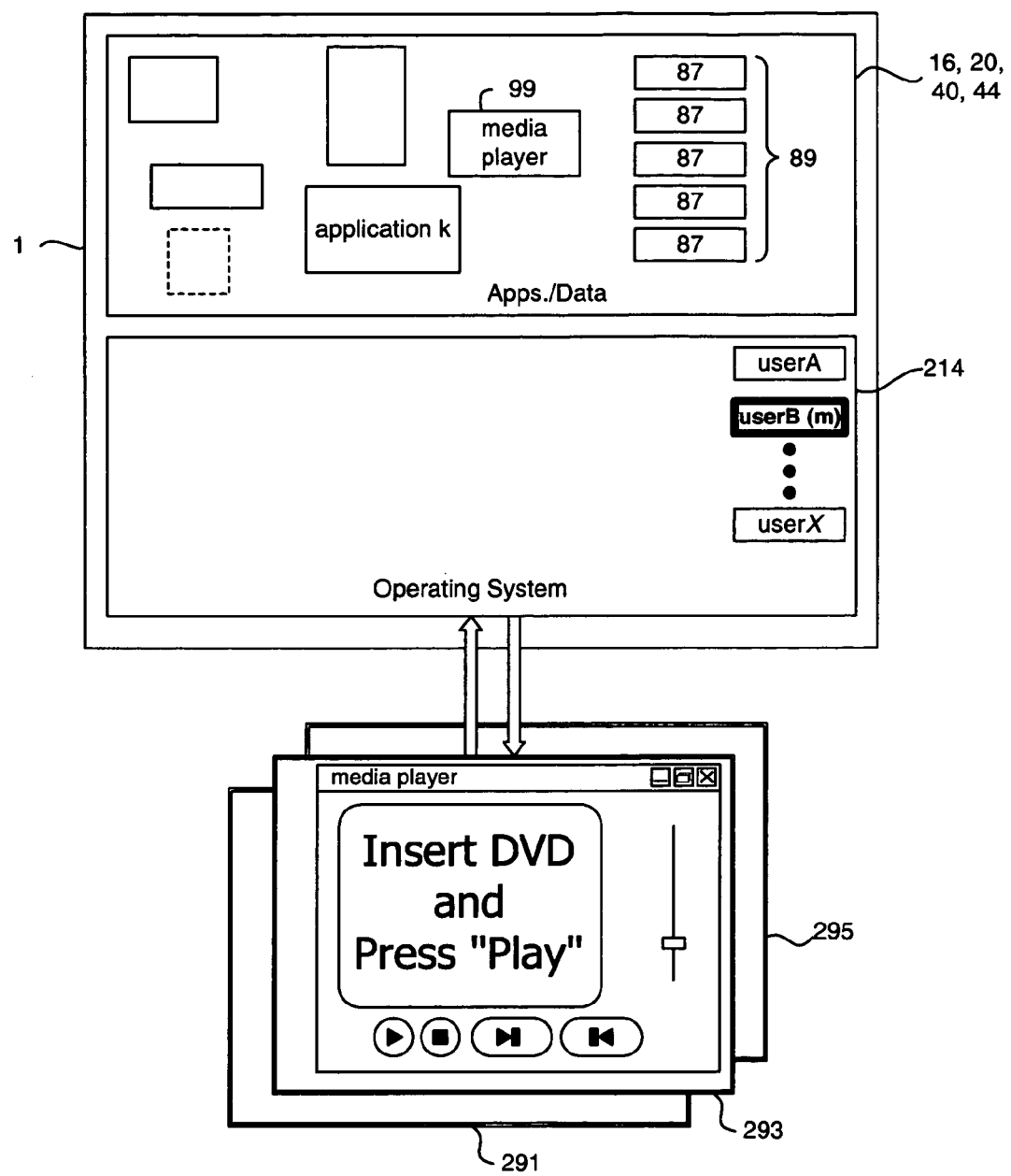

In other embodiments, and as shown in FIGS. 10-13, there is no pre-dedicated account for media playback. Instead, a user (e.g., a user with administrative privileges) designates an account to be associated with media playback button 281. The user may create an account for that purpose, or may choose a pre-existing account. In FIG. 10, account userB has been designated (shown with an "(m)") for activation upon pressing button 281. If there were only one account in OS 214, that account would be associated with button 281. If there is no password associated with the designated account, pressing media playback button 281 from an S5 state will cause OS 214 to boot, automatically open the designated account (without displaying a logon screen) and launch media player application 99. As shown in FIG. 11, the user then has whatever access rights are associated with the designated account. If desired, activation of another account can be performed (using, e.g., the above described fast user switching). If a user has already activated an account other than the designated media playback account and then presses button 281, media player application 99 is automatically launched in the active account (as in FIGS. 8 and 9).

As with previously described embodiments, the embodiments of FIGS. 10 and 11 are not limited to operation from an S5 power state. If, for example, no accounts are activated and computer 1 is in an S3 or S4 power state, pressing button 281 causes OS 214 to wake computer 1, activate account userB (after entry of a password, if enabled) and automatically launch media player application 99. If a non-designated account (e.g., userA) is activated when computer 1 transitions to an S3 or S4 state, pressing button 281 will cause OS 214 to 1) wake computer 1, 2) require entry of the userA password (if there is a password for the userA account and OS 214 is configured to check the password upon waking from an S3 or S4 state), and then 3) launch media player application 99. As with the embodiments described in connection with FIGS. 5-9, the application launched by OS 214 in response to a press of media playback button 281 can be configured by a user in the embodiments of FIGS. 10 and 11.

Figure 12:
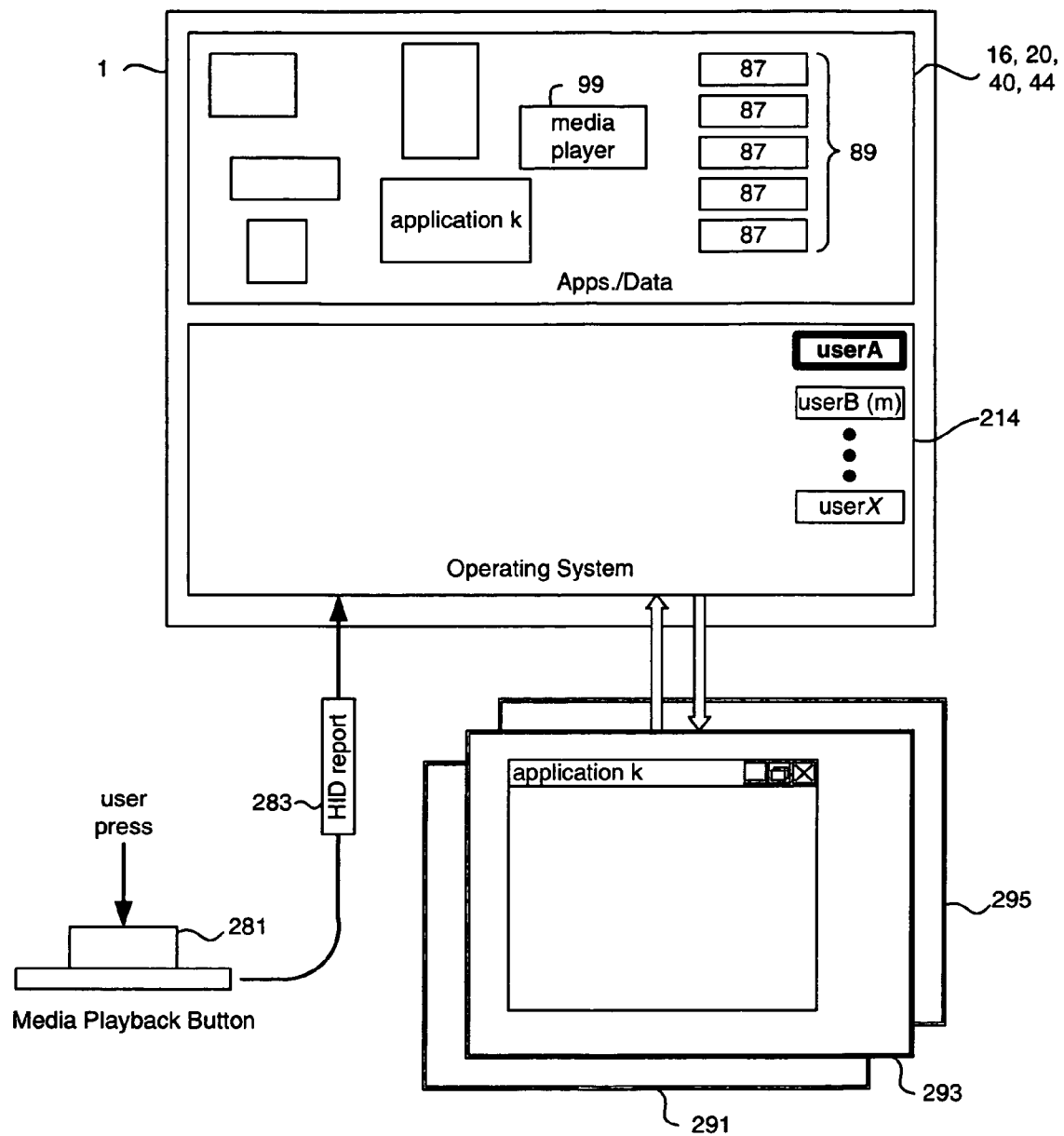
FIGS. 12 and 13 show variations on the direct media playback of FIGS. 10 and 11.
Figure 13:
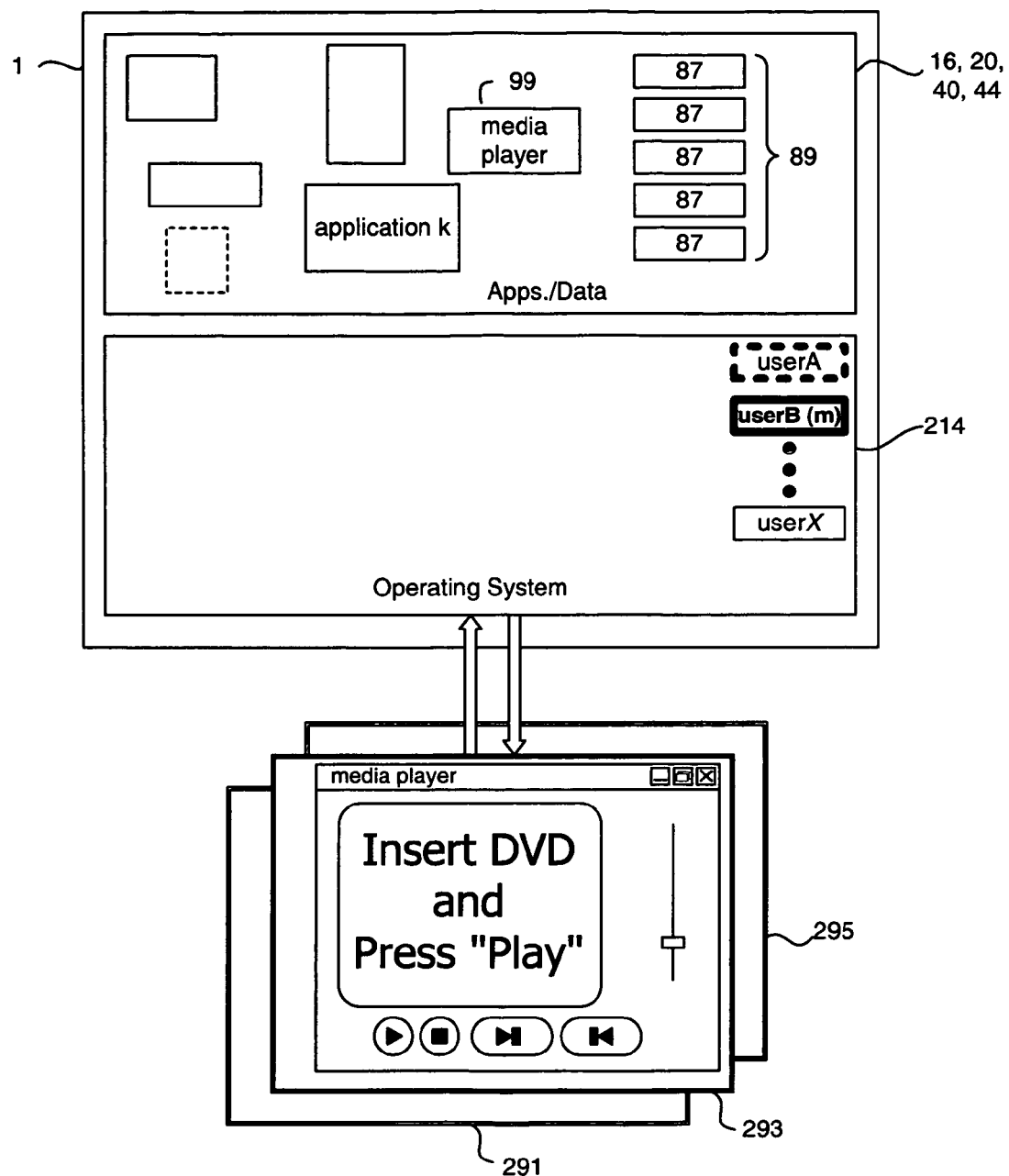

FIGS. 12 and 13 show a variation of the embodiment of FIGS. 10 and 11. In FIG. 12, the userA account is logged in and activated, and application k is running when media playback button 281 is pressed. Upon receipt of HID report 283, and as shown in FIG. 13, OS 214 activates designated media playback account userB and automatically launches media player 99. If the userB account is password protected, OS 214 will first require entry of that password at logon desktop 291 before activating the userB account. In FIG. 13, the userA account remains activated, but is now in the background. The userA account can be returned to the foreground using fast user switching. In alternate embodiments, the userA account is automatically logged out when media button 281 is pressed. If in FIG. 12 the userA account was logged in and computer 1 was in an S3 or S4 state, pressing button 281 would cause OS 214 to wake computer 1, activate the userB account (after entry of any required password) and automatically launch media player 99. In still other embodiments, and similar to embodiments previously described, the application launched by OS 214 in FIGS. 12 and 13 in response to a press of media playback button 281 can be configured by a user.

Figure 14:
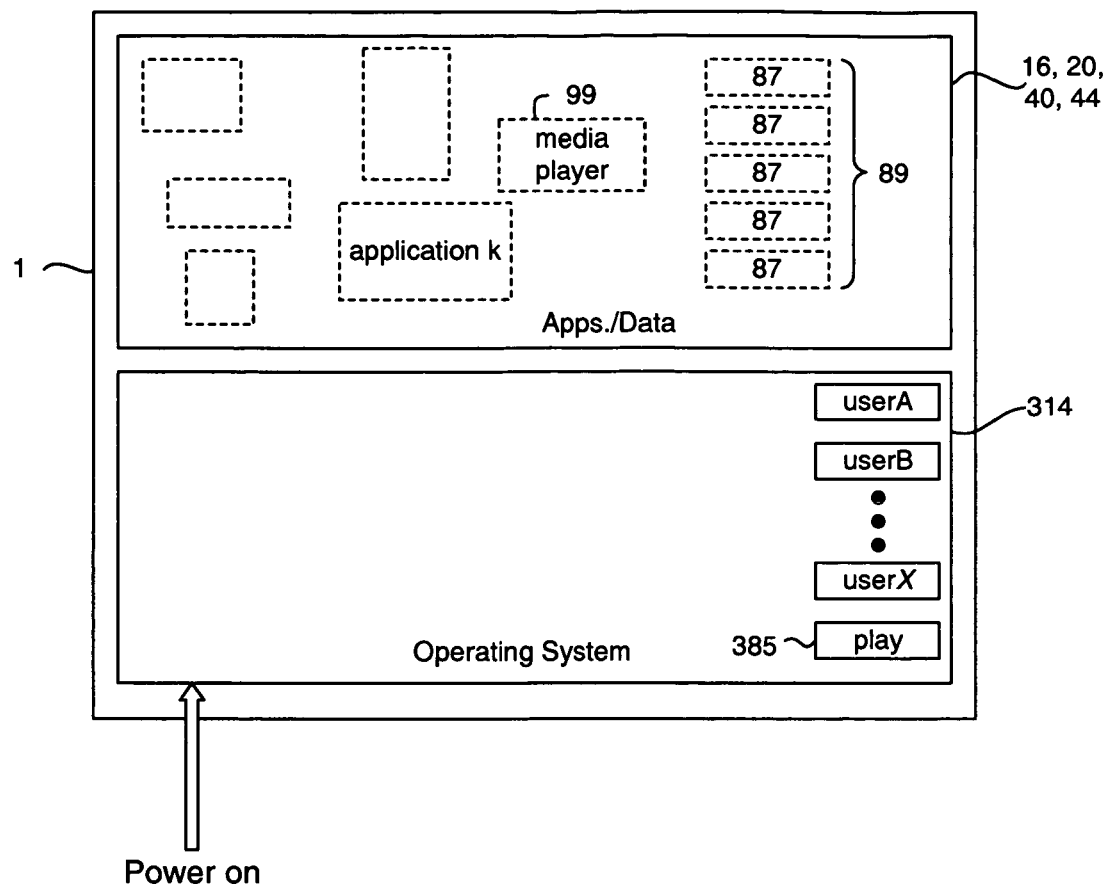
FIGS. 14-16 show direct media playback according to some further illustrative embodiments of the invention in which a dedicated media playback hardware button is not used.
Figure 15:
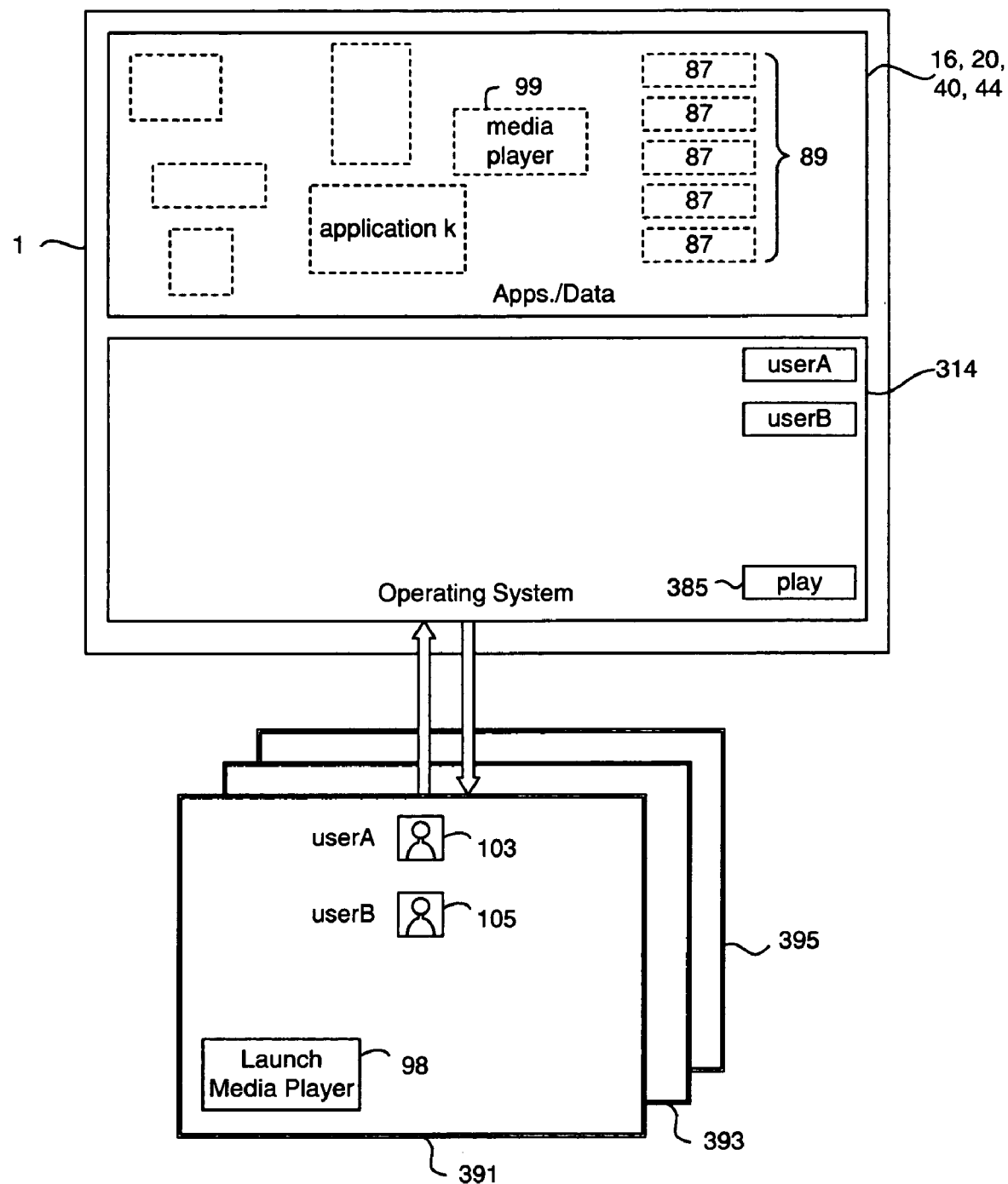
Figure 16:
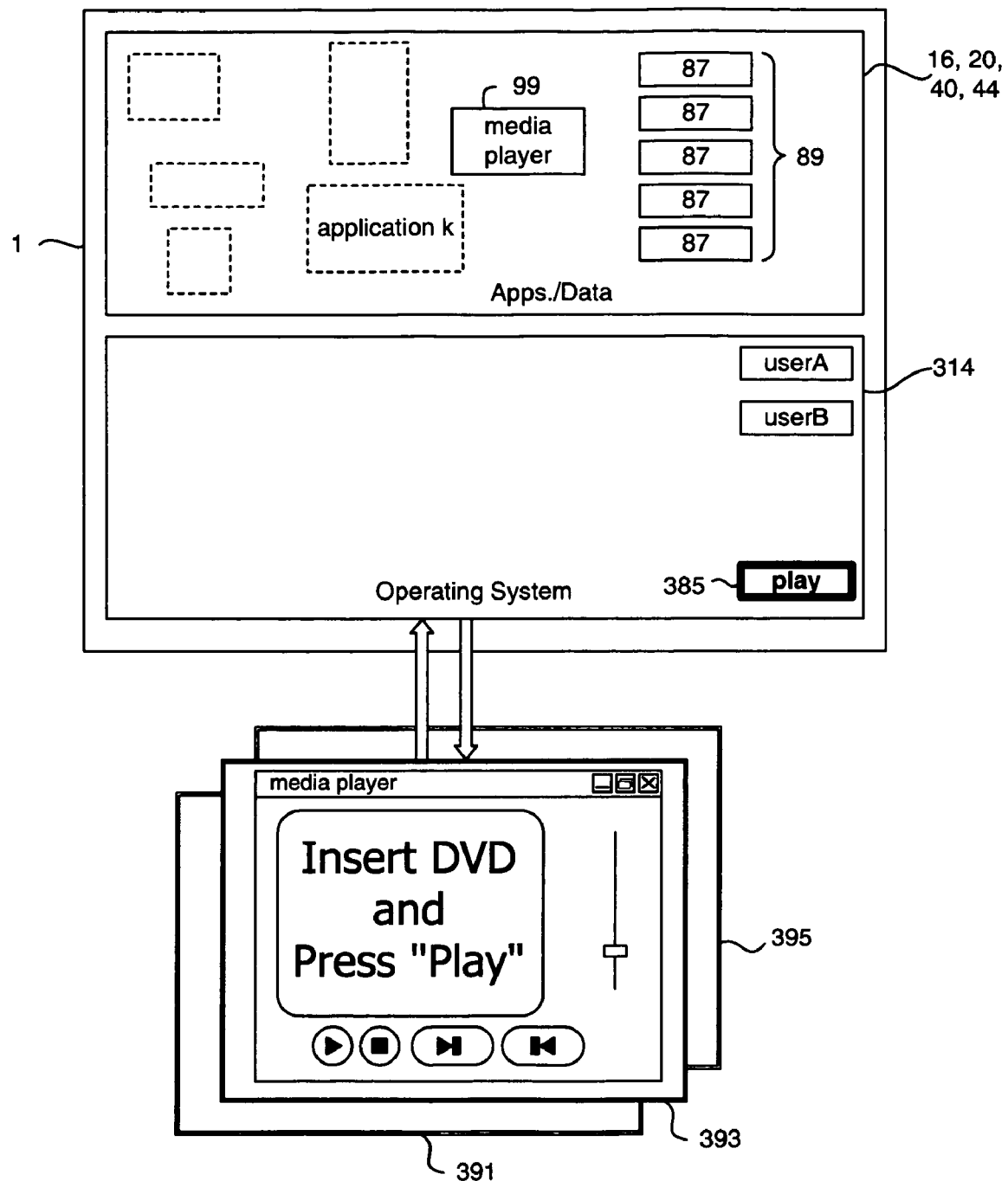

FIGS. 14-16 show media playback under at least some additional embodiments of the invention. In the embodiments of FIGS. 14-16, there is no separate media playback hardware button. Instead, a software "button" is used. In FIG. 14, a user turns on computer 1 by pressing a conventional on/off button (not shown). Instead of a conventional log on dialog, however, and as shown in FIG. 15, the user is presented (via desktop 391) with a dialog allowing the user to select the account under which the user will log on. As in existing versions of the WINDOWS XP OS, a user can select a screen icon corresponding to any of several a conventional accounts. For simplicity, FIGS. 14-16 only include two such conventional accounts (userA and userB). Upon selecting one of the userA or userB icons, the user would be prompted for the password associated with the corresponding account (if password protection is enabled for that account). Upon entry of the proper password, the selected account would be activated. Unlike existing software, however, the dialog also includes an additional icon 98 corresponding to playback account 385. Playback account 385 is similar to account 85 of FIGS. 5-9; playback account 385 is only allowed to access media player application 99 and certain media files located in predesignated directories. In at least some embodiments implemented using the WINDOWS XP operating system, playback account 385 is similar to a guest account, but has fewer access rights and privileges than a conventional guest account. Icon 98 corresponding to account 385 has a different appearance than icons for other accounts. In this manner, icon 98 appears to the user as a virtual media-playback button. Upon selecting icon 98, and as shown in FIG. 16, playback account 385 is opened and media player application 99 is automatically launched. The user may then playback media in accordance with the access rights assigned to playback account 385. When the user concludes media playback, the user may then turn off computer 1, return to the logon screen and activate another account, or allow the computer to enter an S3 or S4 state while account 385 is activated.

Various features of previously-described embodiments may also be implemented in the embodiment of FIGS. 14-16. For example, a password can be assigned to playback account 385. Upon selection of icon 98 in the welcome screen 391 dialog, the user would be prompted to enter that password before playback account 385 is opened. A user could also designate a different application to be launched in response to selection of icon 98, and/or designate another account to be opened.

Figure 17:
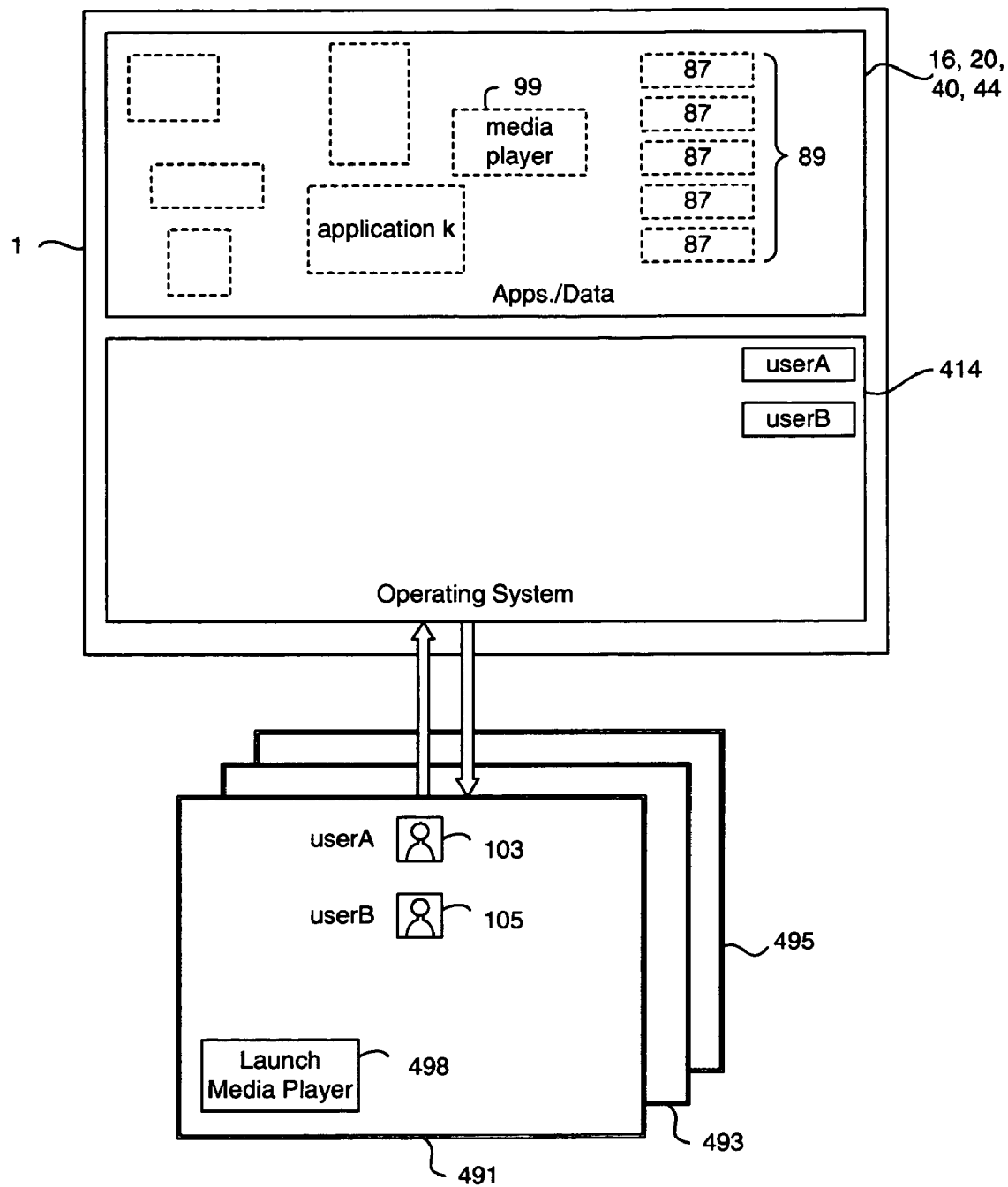
FIGS. 17 and 18 show direct media playback according to some additional illustrative embodiments of the invention.
Figure 18:
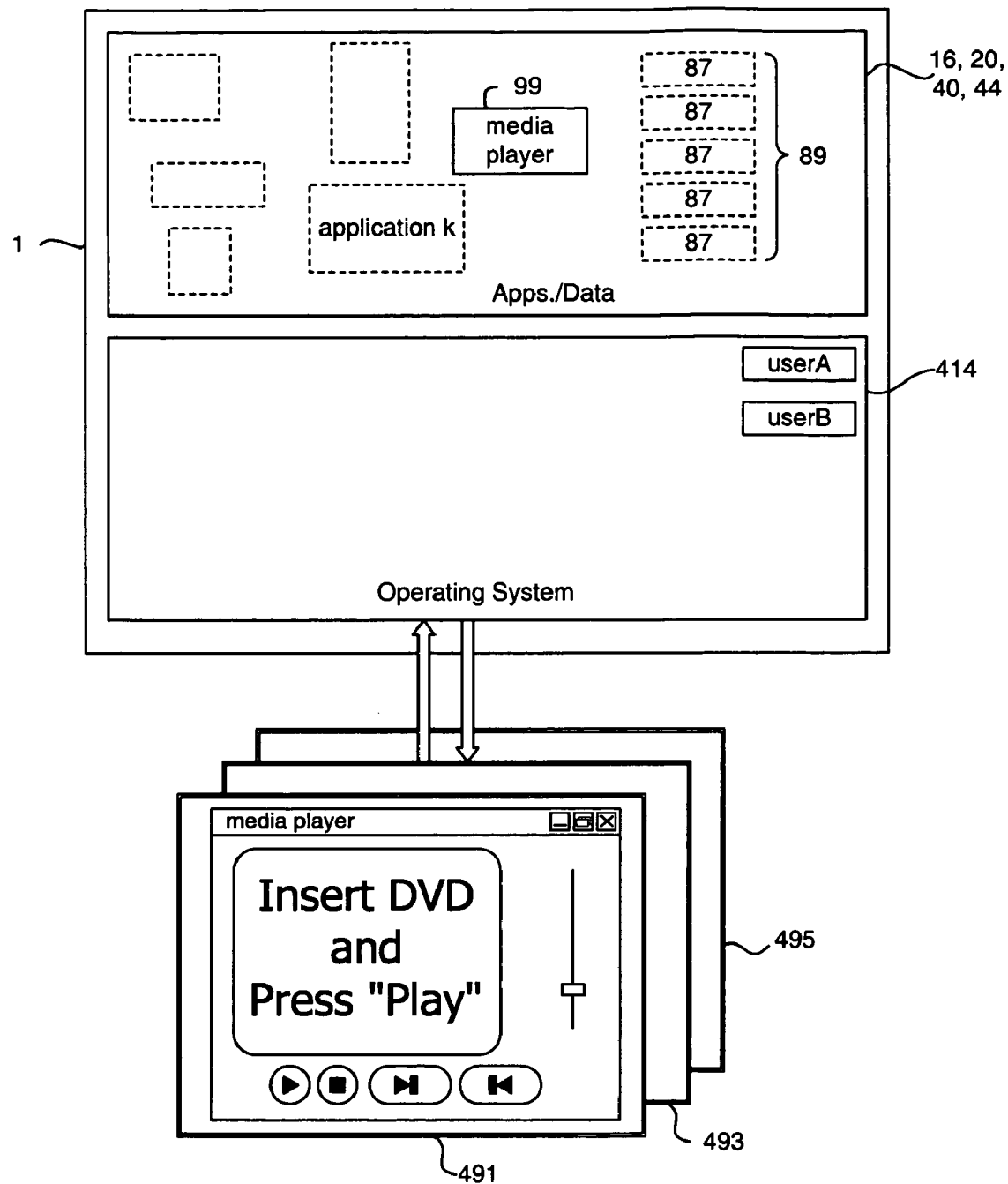
Figure 19:
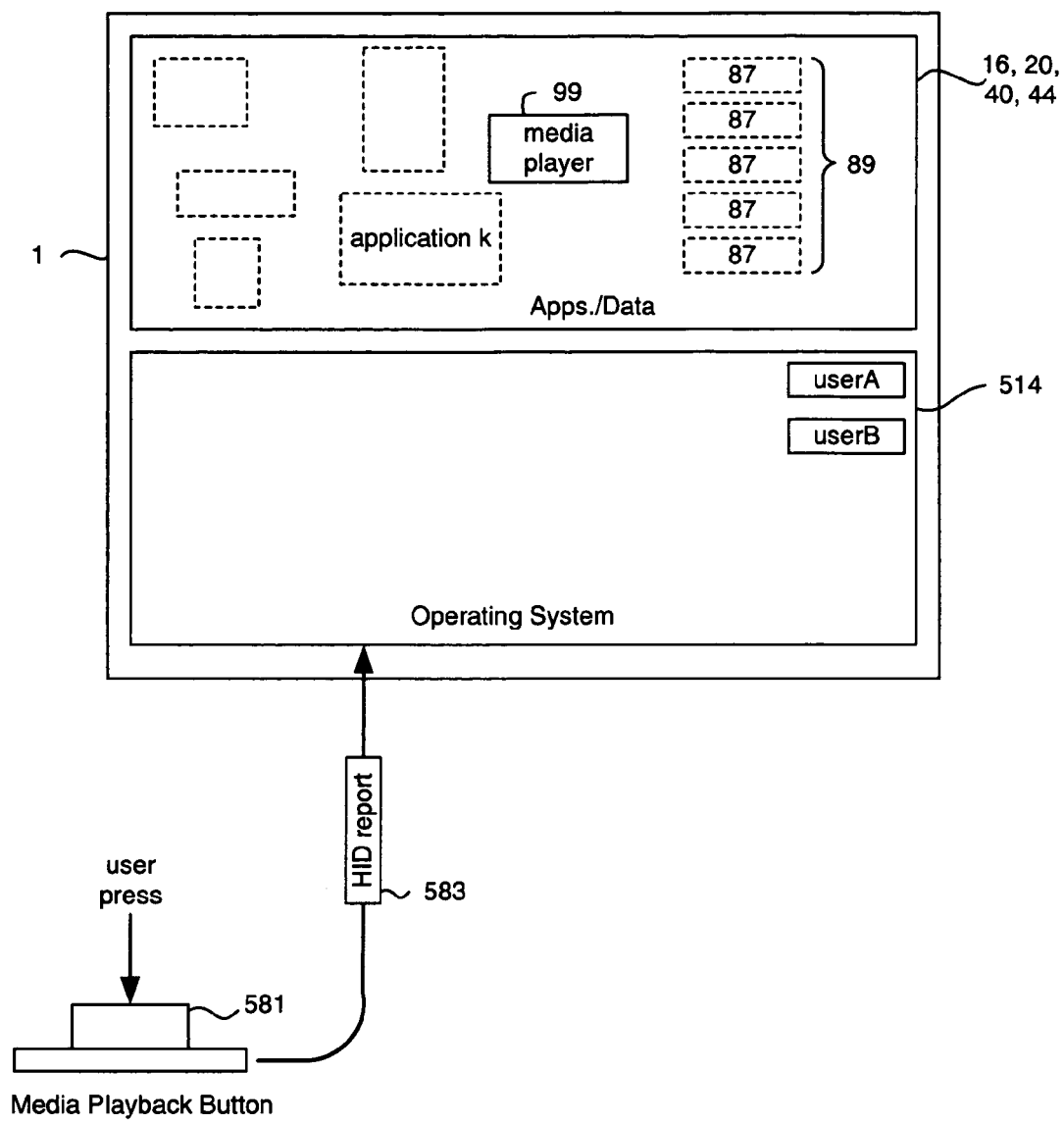
FIGS. 19 and 20 show variations on the direct media playback of FIGS. 17 and 18.
Figure 20:
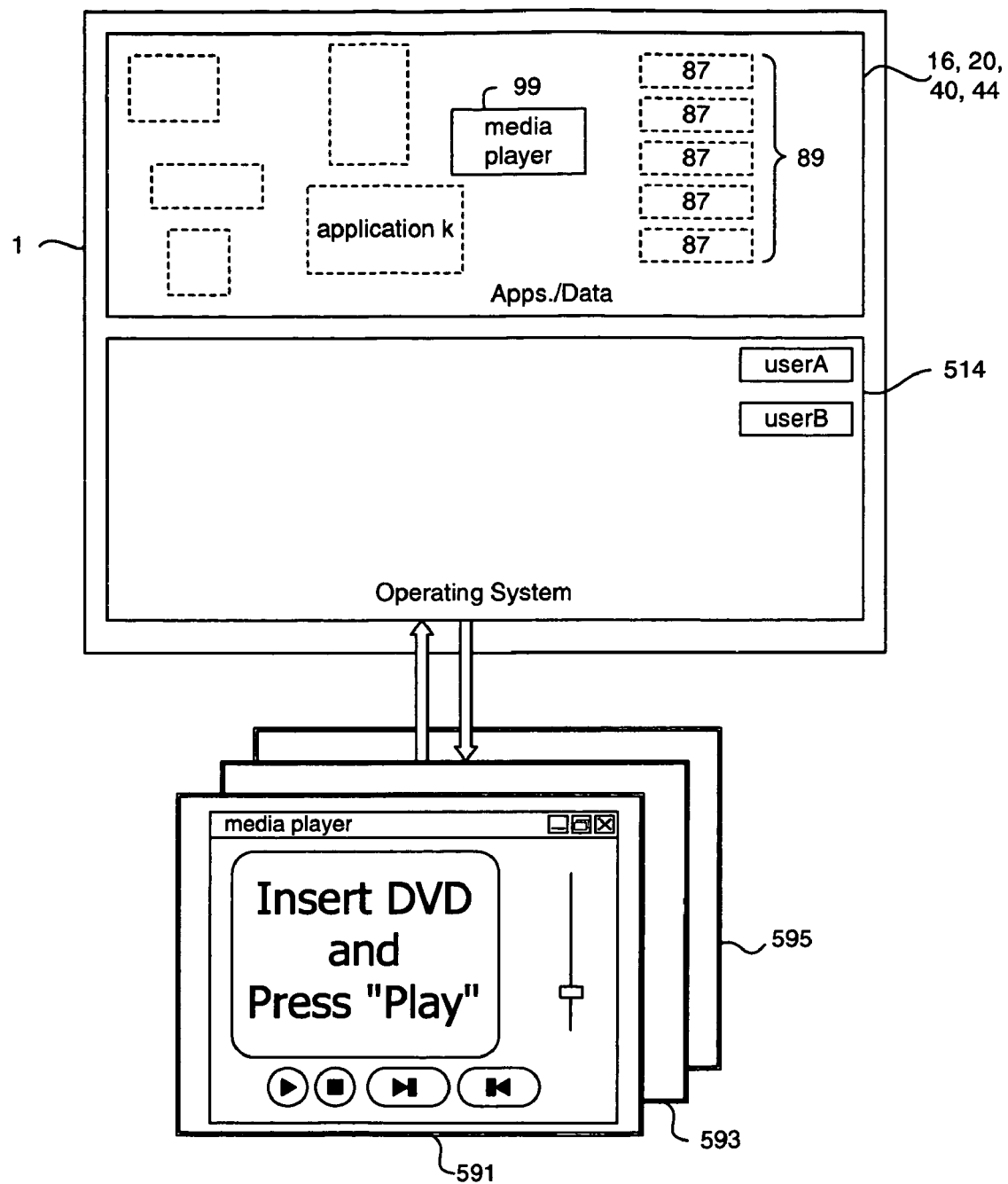

FIGS. 17 and 18 show direct media playback under additional embodiments of the invention. In the embodiments shown in FIGS. 17 and 18, a media playback application is launched from within logon desktop 491. In FIG. 17, the user is able to select an icon corresponding to an account (userA or userB, for example), or to select a media playback icon 498. Upon selecting icon 498, as shown in FIG. 18, media player 99 is launched within logon desktop 491. OS 414 does not proceed to application desktop 493. An account has not been opened, and the user is only allowed to replay removable media (e.g., a DVD). The user is not permitted to browse or access other files stored on computer 1. The embodiment of FIGS. 19 and 20 is similar to that of FIGS. 17 and 18, except that a dedicated hardware button 581 is added (FIG. 19). In response to receipt of HID report 583 (generated by a press of button 581) in FIG. 19, OS 514 either boots (if computer 1 is in an S5 power state when button 581 is pressed) or wakes (if computer 1 is in an S3 or S4 state), and opens media player 99 within logon desktop 591 (FIG. 20).

Figure 24:
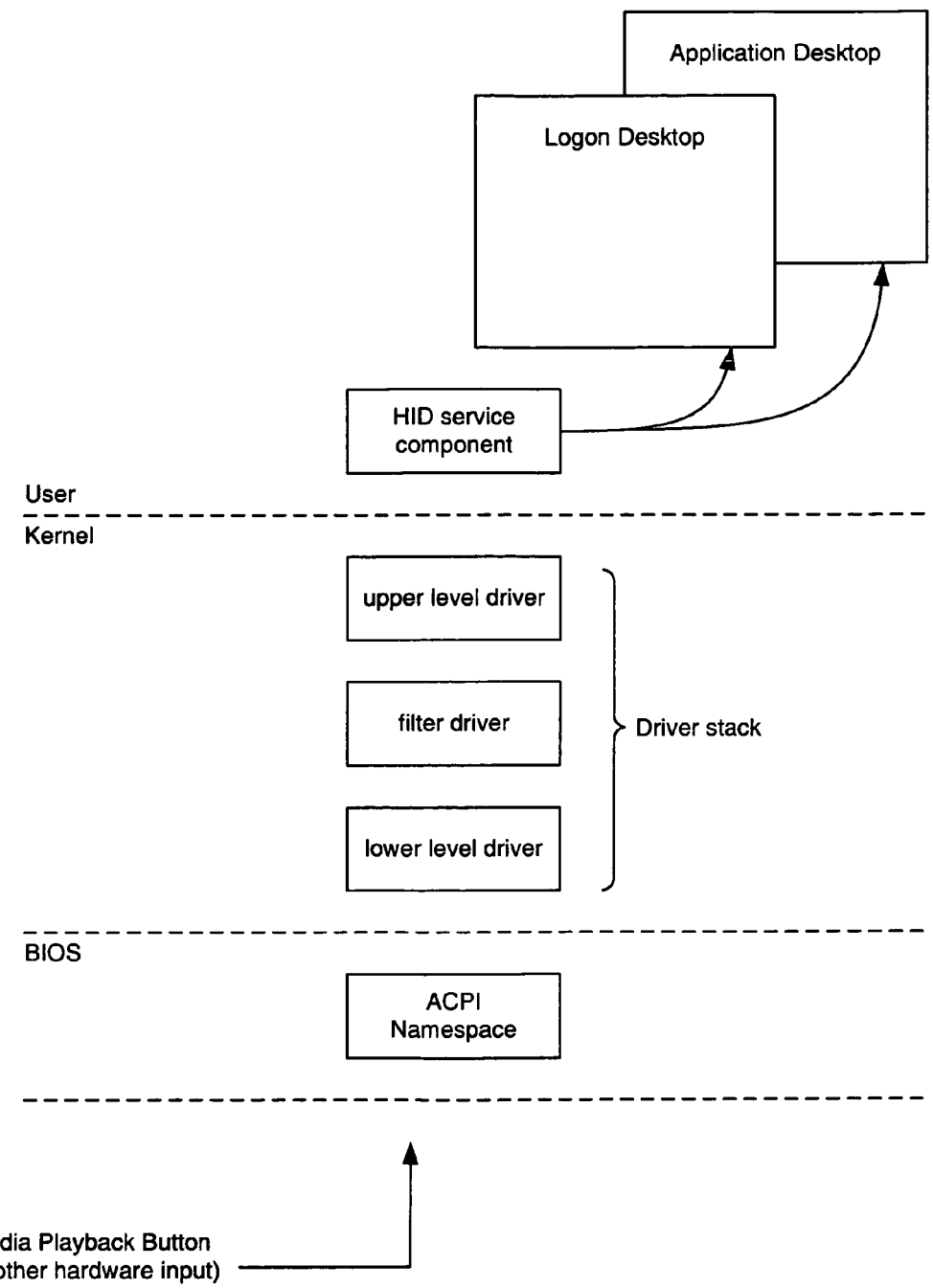
FIG. 24 is a diagram showing creation and processing of a HID report according to at least some embodiments of the invention.

As previously indicated for embodiments implementing a media playback hardware button, pressing such a button causes a HID report to be created and processed by the operating system. FIG. 24 is a diagram showing creation and processing of such a HID report according to at least some embodiments. Included as part of the computer BIOS (basic input/output system) is an ACPI namespace. As is known in the art, an ACPI Namespace is a hierarchical namespace used by an ACPI BIOS to reference various objects. In at least some embodiments of the invention, the ACPI BIOS is modified to include a new object representing the function of a media playback button. Included as part of that object is a Get HId Report (GHIR) method, described in more detail below.

When the OS is loaded (whether in response to pressing of the media playback button, in response to a power on/off button (not shown), or otherwise), a driver stack is loaded and initialized. In at least some embodiment implemented using the WINDOWS XP OS, the driver stack includes at least three kernel mode elements: a lower level driver (e.g., ACPI.SYS), a filter driver, and an upper level driver (e.g., HIDCLASS.SYS). As part of initializing the driver stack, the upper level driver sends one or more I/O control codes (IOCTL)(not shown) to the filter driver. Similarly, the filter driver "arms" the media playback button for subsequent wake events by leaving an interrupt request packet (IRP) pending with in the lower level driver. The purposes of the pending IOCTL and IRP are discussed below.

If the computer is in an S5 state (soft off) or an S4 state when the media playback button is pressed, loading of the filter driver into system memory will cause the GHIR method for the media playback button to be evaluated. In at least some embodiments, an identifier for the device waking the computer (whether that device is the media playback button, a separate power button, or some other device) is stored in a temporary buffer accessible by the GHIR method. If the GHIR method returns a value containing a HID report code for the media playback button (or other device), the filter driver forwards the media playback button HID code, via the upper level driver, to a user-level HID service component. If the computer is booting from an S5 state or awaking from an S4 state in which no user was logged in, the HID service component then provides one or more messages to the logon desktop indicating that the media playback button has been pressed. In response, a media player user account is activated and a media player application launched. If the computer is waking from an S4 state in which a user account was already active, the HID service component provides one or more messages to an application desktop and causes the media player application to be launched.

If the computer is in an S3 state when the media playback button is pressed, the driver stack will already be loaded in system memory. In response to pressing of the media playback button, an event handler method for that button (also defined in the ACPI namespace) causes a notification (e.g., a Notify command) to be sent to the filter driver and to the lower level driver. In response to this notification, the lower level driver completes the pending IRP (which is still pending because the OS remains in system memory during S3) and forwards the completed IRP to the filter driver. The filter driver then calls into the lower level driver and causes the lower level driver to evaluate the GHIR method and retrieve a HID report for the media playback button. The filter driver then completes the pending IOCTL (which is still pending because the OS remains loaded in an S3 state) and forwards same, via the upper level driver, to the HID service component. If the computer is waking from an S3 state in which no user was logged in, the HID service component then provides one or more messages to the logon desktop indicating that the media playback button has been pressed. In response, a media player user account is activated and a media player application launched. If the computer is waking from an S3 state in which a user account was already active, the HID service component provides one or more messages to an application desktop and causes the media player application to be launched.

Although specific examples of carrying out the invention have been described, those skilled in the art will appreciate that there are numerous other variations and permutations of the above described systems and techniques that fall within the spirit and scope of the invention as set forth in the appended claims. For example, programming instructions for translating a media playback button HID event into a specific action need not be part of an OS. Instead, such instructions could be part of some other code which has been loaded by the OS and which is running in a pre-login environment. A media-playback mode could also be initiated by action of other hardware elements. For example, an OS could be configured such that placing a DVD into a DVD player when the computer is in an S3, S4 or S5 state has the same effect as pressing a dedicated media playback button. As shown in FIG. 24 ("or other hardware input"), appropriate objects can be added to the ACPI namespace, and the driver stack and HID service component configured, such that placing a DVD (or other removable medium) into a DVD player (or other removable medium hardware device) when the computer is in an S3, S4 or S5 state has the same effect as pressing a dedicated media playback button. In still other embodiments, a media playback program could reside in the OS instead of in a separate media player application. In such a case, executing a media playback program would comprise executing the OS-resident media playback program. In yet other embodiments, completion of media playback (e.g., reaching the end of a DVD) could result in the OS automatically returning to a state occupied prior to initiating media playback (e.g., logged out, logged in as a different user, in an S3, S4 or S5 state, etc.). These and other modifications are within the scope of the invention as defined by the attached claims.

The invention claimed is:

1. A computer-readable storage medium having stored thereon data representing sequences of instructions which, when executed by a processor, cause the processor to perform steps of a method for accessing a media playback program stored on a computer having an operating system and configurable to have one or more user accounts, the operating system linking a user of the computer with one of the one or more user accounts and controlling access to programs and data objects based on the linked user account, the method comprising the steps of:

associating a first of the one or more user accounts with playback of media using resources of the computer;

receiving an instruction from a dedicated media playback hardware button, which automatically results in the computer turning on and initiating media playback, the dedicated media playback hardware button being located on the computer;

linking the first user account with the current computer user in response to the received instruction; and automatically executing a media playback program in response to the received instruction from actuation of the dedicated media playback hardware button, the media playback program being associated with the operating system, and the operating system providing a platform adapted to execute non-media related instructions.

2. The computer-readable storage medium of claim 1, wherein the first user account is a dedicated media playback account limited to media playback.

3. The computer-readable storage medium of claim 1, wherein the first user account is a dedicated media playback account limited to executing media playback programs and accessing media data files stored in a directory accessible by others of the one or more user accounts.

4. The computer-readable storage medium of claim 1, wherein the received instruction is generated in response to placing a removable medium into a hardware device.

5. The computer-readable storage medium of claim 1, comprising further instructions for performing steps comprising: displaying a login user interface having a plurality of selectable options, a first of said options corresponding to linking the current computer user with the first user account, and a second of said options corresponding to linking the current computer user with a different one of the one or more user accounts; and receiving a selection of the first option.

6. The computer-readable storage medium of claim 1, comprising further instructions for performing steps comprising: receiving a second instruction to initiate media playback, wherein the second instruction is received while the operating system links the current computer user with a second one of the one or more user accounts, and wherein the second user account is different from the first user account; and executing the media playback program in response to the second received instruction and while the operating system continues to link the current computer user with the second user account.

7. The computer-readable storage medium of claim 1, comprising further instructions for performing steps comprising: receiving a second instruction to initiate media playback, wherein the second instruction is received while the operating system links the current computer user with a second one of the one or more user accounts, and wherein the second user account is different from the first user account; and executing the media playback program in response to the second received instruction and while the operating system links the current computer user with the first user account.

8. The computer-readable storage medium of claim 7, comprising further instructions for performing steps comprising linking the current computer user with the first user account in response to the second received instruction.

9. The computer-readable storage medium of claim 8, comprising further instructions for performing steps comprising, in response to the second received instruction, discontinuing a link of the current computer user to the second user account.

10. The computer-readable storage medium of claim 1, wherein the first user account has access rights which are not restricted to media playback programs and data objects located in a directory accessible from within other accounts.

11. The computer-readable storage medium of claim 1, comprising further instructions for performing steps comprising determining whether the computer is on a domain, and wherein the step of linking the first user account includes linking the first user account only upon determining the computer is not on a domain.

12. The computer-readable storage medium of claim 1, comprising further instructions for performing steps comprising: receiving a designation of a second one of the one or more user accounts; associating the second user account with playback of media using resources of the computer; receiving a second instruction from the current computer user to initiate media playback; linking the second user account with the current computer user in response to the second received instruction; and executing the media playback program in response to the second received instruction.

13. The computer-readable storage medium of claim 1, comprising further instructions for performing steps comprising: receiving a designation of the media playback program; and configuring the computer, in response to said received designation, to execute the media playback program as part of association of a current user wit the first user account.

14. A computer-readable storage medium having stored thereon data representing sequences of instructions which, when executed by a processor, cause the processor to perform steps of a method for accessing a media playback program stored on a computer having an operating system and configurable to have one or more user accounts, the operating system linking a user of the computer with one of the one or more user accounts and controlling access to programs and data objects based on the linked user account, the method comprising the steps of:

receiving a first instruction from a dedicated media playback hardware button, which automatically results in the computer turning on and initiating media playback, the dedicated media playback hardware button being located on the computer;

generating a login display including a user interface for receiving identification of the one of the one or more user accounts, the user interface also enabling selection of a media playback option;

receiving a selection of the media playback option from actuation of a dedicated media playback hardware button;

automatically executing a media playback program in response to the received selection from actuation of the dedicated media playback hardware button and from within the login display, the media playback program being associated with the operating system and executing playback of a removable storage medium without permitting access to data files or application programs stored on the computer, the operating system linking a playback account with a current computer user in response to the received first instruction and the operating system providing a platform adapted to execute non-media related instructions; and receiving a second instruction from the dedicated media playback hardware button resulting in the computer shutting down.

15. A computer-readable storage medium having stored thereon data representing sequences of instructions which, when executed by a processor, cause the processor to perform steps of a method for accessing a media playback program stored on a computer having an operating system, the operating system controlling access to programs and data objects, the method comprising the steps of:

receiving a first instruction from a dedicated media playback hardware button located on the computer, which automatically results in the computer turning on and initiating media playback;

receiving a second instruction from a dedicated media playback hardware button to initiate media playback, the dedicated media playback hardware button located on the computer;

linking a first user account with a current computer user in response to the received first instruction; and automatically executing, in response to the received first instruction from the dedicated media playback hardware button, a media playback program, the media playback program being associated with the operating system, and the operating system providing a platform adapted to execute non-media related instructions.

* * * * *

UNITED STATES PATENT AND TRADEMARK OFFICE
CERTIFICATE OF CORRECTION

PATENT NO. : 7,634,734 B2 Page 1 of 1
APPLICATION NO. : 11/044713
DATED : December 15, 2009
INVENTOR(S) : Fuller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 968 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,634,734 B2 | Page 1 of 1 |
| APPLICATION NO. | : 11/044713 | |
| DATED | : December 15, 2009 | |
| INVENTOR(S) | : Andrew J. Fuller et al. | |

It is certified that error appears in the above-identified patent and that said Letters Patent is hereby corrected as shown below:

In column 16, line 48, in Claim 13, delete "wit" and insert -- with --, therefor.

Signed and Sealed this

Seventeenth Day of May, 2011

David J. Kappos
*Director of the United States Patent and Trademark Office*